(12) United States Patent
Choi et al.

(10) Patent No.: US 10,158,408 B2
(45) Date of Patent: Dec. 18, 2018

(54) APPARATUS AND METHOD FOR CHANNEL INFORMATION FEEDBACK IN WIRELESS COMMUNICATION SYSTEM

(71) Applicants: Samsung Electronics Co., Ltd., Suwon-si, Gyeonggi-do (KR); Purdue Research Foundation, West Lafayette, IN (US)

(72) Inventors: Jun-Il Choi, West Lafayette, IN (US); David J. Love, West Lafayette, IN (US); Tae-Young Kim, Seongnam-si (KR); Keon-Kook Lee, Suwon-si (KR)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 137 days.

(21) Appl. No.: 14/669,812

(22) Filed: Mar. 26, 2015

(65) Prior Publication Data

US 2015/0280884 A1    Oct. 1, 2015

Related U.S. Application Data

(60) Provisional application No. 61/971,146, filed on Mar. 27, 2014.

(30) Foreign Application Priority Data

Mar. 13, 2015    (KR) ........................ 10-2015-0035062

(51) Int. Cl.
*H04L 5/00* (2006.01)
*H04B 7/0456* (2017.01)
(Continued)

(52) U.S. Cl.
CPC ....... *H04B 7/0478* (2013.01); *H04L 25/0391* (2013.01); *H04L 25/03974* (2013.01); *H04L 25/0224* (2013.01)

(58) Field of Classification Search
CPC ............ H04B 7/0478; H04L 25/03974; H04L 5/0057; H04L 25/0391; H04W 72/046
See application file for complete search history.

(56) References Cited

U.S. PATENT DOCUMENTS 8,675,762 B2    3/2014  Cheng et al.
2008/0095121 A1*  4/2008  Shattil ................ H04J 13/0003
                                                370/335

(Continued)

FOREIGN PATENT DOCUMENTS

KR    10-2013-0097117 A    9/2013
KR    10-2013-0143124 A    12/2013

OTHER PUBLICATIONS

T. L. Marzetta, "Noncooperative Cellular Wireless With Unlimited Numbers of Base Station Antennas," IEEE Transactions on Wireless Communications, Nov. 2010, pp. 3590-3600, vol. 9, No. 11.

(Continued)

*Primary Examiner* — Anez C Ebrahim
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates beyond 4$^{th}$-Generation (4G) communication system such as Long Term Evolution (LTE). A channel information feedback in a wireless communication system and a method of a receiving node of a wireless communication system are provided. The method includes transmitting an indication representing an indexing rule for channel values and block-wise quantized channel information, and receiving beamformed signals mapped to an antenna based on the indexing rule.

16 Claims, 26 Drawing Sheets

(51) Int. Cl.
*H04L 25/03* (2006.01)
*H04L 25/02* (2006.01)

(56) References Cited

U.S. PATENT DOCUMENTS

| | | | |
|---|---|---|---|
| 2013/0172002 A1* | 7/2013 | Yu | H04W 72/046 455/452.1 |
| 2015/0016379 A1 | 1/2015 | Nam et al. | |
| 2016/0173177 A1* | 6/2016 | Zhu | H04W 8/005 370/329 |

OTHER PUBLICATIONS

F. Rusek et al., "Scaling Up MIMO: Opportunities and Challenges With Very Large Arrays," IEEE Signal Processing Magazine, Jan. 2013, pp. 40-60, vol. 30, No. 11.

Y. Nam et al., "Full-Dimension MIMO (FD-MIMO) for Next Generation Cellular Technology," IEEE Communications Magazine, Jun. 2013, pp. 172-179, vol. 51, No. 6.

C. K. Au-Yeung et al., "On the Performance of Random Vector Quantization Limited Feedback Beamforming in a MISO System," IEEE Transactions on Wireless Communications, Feb. 2007, pp. 458-462, vol. 6, No. 2.

J. Choi et al., "Trellis-Extended Codebooks and Successive Phase Adjustment: A Path from LTE-Advanced to FDD Massive MIMO Systems," IEEE Transactions on Wireless Communications, Jan. 2014, pp. 1-11.

J. Li et al., "Codebook Design for Uniform Rectangular Arrays of Massive Antennas," IEEE VTC, 2013.

X. Su et al., "Limited Feedback Precoding for Massive MIMO," International Journal of Antennas and Propagation, 2013.

D. Ying et al., "Kronecker Product Correlation Model and Limited Feedback Codebook Design in a 3D Channel Model," IEEE ICC—Wireless Communications Symposium, 2014, pp. 5865-5870.

D. J. Ryan et al., "QAM and PSK Codebooks for Limited Feedback MIMO Beamforming", IEEE Transactions on Communications, Apr. 2009, pp. 1184-1196, vol. 57, No. 4.

J. Choi et al., "Noncoherent Trellis-Coded Quantization for Massive MIMO Limited Feedback Beamforming", UCSD Information Theory and Applications Workshop, Feb. 2013.

J. Choi et al. "Limited Feedback in Massive MIMO Systems: Exploiting Channel Correlations via Noncoherent Trellis-Coded Quantization," Proceedings of Conference on Information Sciences and Systems, Mar. 2013.

J. Choi et al., "Noncoherent Trellis Coded Quantization: A Practical Limited Feedback Technique for Massive MIMO Systems," IEEE Transactions on Communications, Dec. 2013, pp. 5016-5029, vol. 61, No. 12.

W. Sweldens, "Fast Block Noncoherent Decoding," IEEE Communications Letters, Apr. 2001, pp. 132-134, vol. 5, No. 4.

* cited by examiner

: ANTENNA GROUP USNG 4TX STRUCTURED CODEBOOK $$h = \begin{bmatrix} 0.3802 - 0.0878i \\ 1.2968 + 1.0534i \\ -1.5972 + 0.9963i \\ 0.6096 + 1.0021i \\ 0.2254 + 0.4748i \\ -0.9247 - 0.8538i \\ -0.3066 + 0.5072i \\ 0.2423 + 1.1528i \\ 2.5303 + 0.3457i \\ 1.9583 + 0.7316i \\ -0.9545 + 0.5140i \\ 2.1460 - 0.2146i \\ 0.5129 + 0.2078i \\ -0.0446 - 0.5567i \\ 0.5054 + 0.6282i \\ -0.1449 - 0.8111i \end{bmatrix} \begin{matrix} \left.\vphantom{\begin{matrix}a\\a\\a\\a\end{matrix}}\right\}\text{1701}\ L=1 \\ \left.\vphantom{\begin{matrix}a\\a\\a\\a\end{matrix}}\right\}\text{1702}\ L=2 \\ \left.\vphantom{\begin{matrix}a\\a\\a\\a\end{matrix}}\right\}\text{1703}\ L=3 \\ \left.\vphantom{\begin{matrix}a\\a\\a\\a\end{matrix}}\right\}\text{1704}\ L=4 \end{matrix}$$

$$\hat{h} = \begin{bmatrix} w_1^{\{1\}} \\ w_3^{\{1\}} \\ w_0^{\{1\}} \\ w_6^{\{1\}} \end{bmatrix} = \begin{bmatrix} 0.5000 \\ 0 + 0.5000i \\ -0.5000 \\ 0 - 0.5000i \\ 0.5000 \\ 0 - 0.5000i \\ -0.5000 \\ 0 + 0.5000i \\ 0.5000 \\ 0.5000 \\ 0.5000 \\ 0.5000 \\ 0.5000 \\ -0.3536 - 0.3536i \\ 0 + 0.5000i \\ 0.3536 - 0.3536i \end{bmatrix}$$

FIG.18

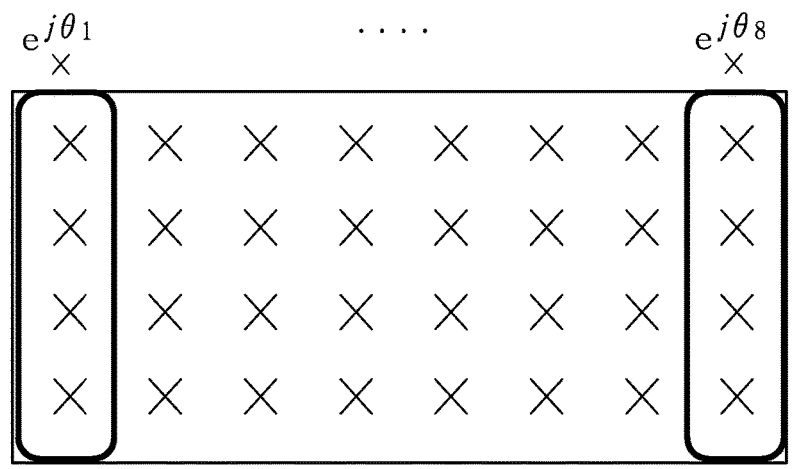
FIG.23A
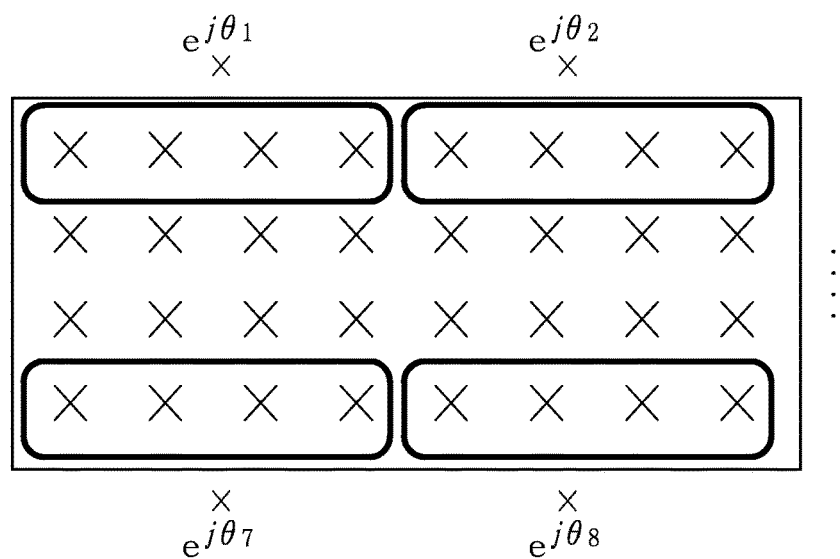
FIG.23B
 : ANTENNA GROUP

APPARATUS AND METHOD FOR CHANNEL INFORMATION FEEDBACK IN WIRELESS COMMUNICATION SYSTEM

CROSS-REFERENCE TO RELATED APPLICATION(S)

This application claims the benefit under 35 U.S.C. § 119(e) of a U.S. provisional patent application filed on Mar. 27, 2014 in the U.S. Patent and Trademark Office and assigned Ser. No. 61/971,146, and under 35 U.S.C. § 119(a) of a Korean patent application filed on Mar. 13, 2015 in the Korean Intellectual Property Office and assigned Serial number 10-2015-0035062, the entire disclosure of each of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) Samsung Electronics Co., Ltd. and 2) Purdue Research Foundation.

TECHNICAL FIELD

The present disclosure relates to channel information feedback in a wireless communication system.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The concept of adding a large number of transmit antennas, often dubbed massive or large-scale multiple-input multiple-output (MIMO) systems, has been drawing considerable interest from both industry and academia over the past few years. To facilitate beamforming gain and/or spatial multiplexing gain of large-scale MIMO systems, channel state information (CSI) between a transmitter and a receiver is essential at the transmitter side. Time division duplexing (TDD) is often assumed in large-scale MIMO systems to rely on the channel reciprocity property to have the CSI at the transmitter side without pilot transmission and channel estimation/feedback phases. However, Frequency Division Duplexing (FDD) is difficult to acquire the CSI in reliance on the channel reciprocity property because of different frequency bands of both channels.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for channel information feedback in a wireless communication system.

Another aspect of the present disclosure is to provide an apparatus and a method for indicating a characteristic of fed back channel information in a wireless communication system.

Another aspect of the present disclosure is to provide an apparatus and method for notifying a preferred domain of fed back channel information in a wireless communication system.

Another aspect of the present disclosure is to provide an apparatus and method for indicating an indexing rule for channel entries for fed back channel information in a wireless communication system.

Another aspect of the present disclosure an apparatus and method for feeding back quantized channel information in a wireless communication system.

Another aspect of the present disclosure is to provide an apparatus and method for reducing an overhead for channel information feedback in a wireless communication system.

Another aspect of the present disclosure is to provide an apparatus and method for feeding back block-wise configured channel information in a wireless communication system.

Another aspect of the present disclosure is to provide an apparatus and method for selectively feeding back channel information blocked based on different rules in a wireless communication system.

Another aspect of the present disclosure is to provide an apparatus and method for feeding back trellis-code-quantized channel information in a wireless communication system.

Another aspect of the present disclosure is to provide an apparatus and method for generating a trellis extended codebook to be used for quantization of channel information in a wireless communication system.

Another aspect of the present disclosure is to provide an apparatus and method for feeding back quantized and phase-adjusted channel information in a wireless communication system.

Another aspect of the present disclosure is to provide an apparatus and method for reconfiguring channel information from fed back trellis-code-quantized information in a wireless communication system.

Another aspect of the present disclosure is to provide an apparatus and method for reconfiguring channel information from quantized and phase-adjusted information in a wireless communication system.

In accordance with an aspect of the present disclosure, a method of a receiving node of a wireless communication system is provided. The method includes transmitting an indication representing an indexing rule for channel values and block-wise quantized channel information, and receiving beamformed signals mapped to an antenna based on the indexing rule.

In accordance with another aspect of the present disclosure, a method of a transmitting node of a wireless communication system is provided. The method includes receiving an indication representing an indexing rule for channel values and block-wise quantized channel information, and transmitting beamformed signals mapped to an antenna based on the indexing rule.

In accordance with another aspect of the present disclosure, a receiving node apparatus of a wireless communication system is provided. The apparatus includes a transmitter configured to transmit an indication representing an indexing rule for channel values and block-wise quantized channel information, and a receiver configured to receive beamformed signals mapped to an antenna based on the indexing rule.

In accordance with another aspect of the present disclosure, a transmitting node apparatus of a wireless communication system is provided. The apparatus includes a receiver configured to receive an indication representing an indexing rule for channel values and block-wise quantized channel information, and a transmitter configured to transmit beamformed signals mapped to an antenna based on the indexing rule.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will become more apparent from the following description taken in conjunction with the accompanying drawings, in which:

FIG. 17 illustrates a method of channel information in a wireless communication system according to an embodiment of the present disclosure;

FIG. 18 illustrates a method of quantized channel information in a wireless communication system according to an embodiment of the present disclosure;

FIGS. 23A and 23B illustrate phases applied to an antenna group in a wireless communication system according to an embodiment of the present disclosure;

Throughout the drawings, it should be noted that like reference numbers are used to depict the same or similar elements, features, and structures.

DETAILED DESCRIPTION

Figure 1:
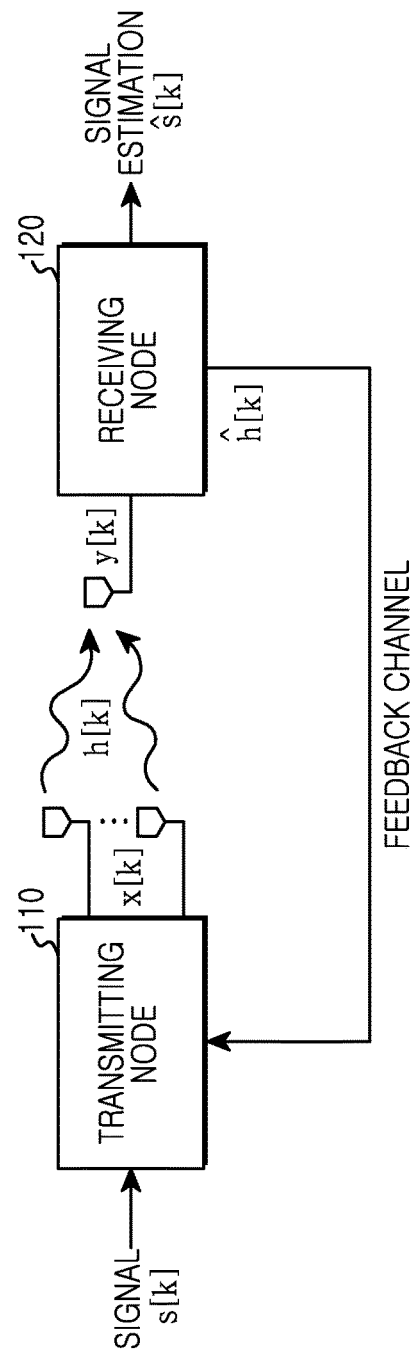
FIG. 1 illustrates a transmitting node and a receiving node in a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Embodiments of the present disclosure describe a technology for channel information feedback in a wireless communication system. More particularly, the present disclosure relates to an apparatus and a method for indicating a characteristic of fed back channel information in a wireless communication system. In the following description, terms denoting signals, terms denoting elements of a channel, terms denoting devices, terms denoting codes, terms denoting a group of channel values and a group of antenna elements, and the like are described for description convenience. Accordingly, the present disclosure is not limited to the terms described later, and other terms denoting objects having the same technological meaning may be used.

Prior to describing various embodiments of the present disclosure, related technologies will be described. In describing the technologies, the following documents will be referred.

[1] C. K. Au-Yeung and D. J. Love, "On the performance of random vector quantization limited feedback beamforming in a MISO system," IEEE Trans. Wireless Commun., vol. 6, no. 2, pp. 458-462, February 2007.

[2] J. Choi, D. J. Love, and T. Kim, "Trellis-Extended Codebooks and Successive Phase Adjustment: A Path from LTE-Advanced to FDD Massive MIMO Systems," submitted to IEEE Trans. Wireless Commun., January 2014.

[3] J. Li, X. Su, J. Zeng, Y. Zhao, S. Yu, L. Xiao, and X. Xu, "Codebook Design for Uniform Rectangular Arrays of Massive Antennas," in IEEE VTC Spring, 2013.

[4] X. Su, J. Zeng, J. Li, L. Rong, L. Liu, X. Xu, and J. Wang, "Limited Feedback Precoding for Massive MIMO," International Journal of Antennas and Propagation, 2013.

[5] D. Ying, F. W. Vook, T. A. Thomas, D. J. Love, A. Ghosh, "Kronecker Product Correlation Model and Limited Feedback Codebook Design in a 3D Channel Model," accepted to IEEE ICC 2014.

[6] D. J. Ryan, I. V. L. Clarkson, I. B. Collings, D. Guo, and M. L. Honig, "QAM and PSK codebooks for limited feedback MIMO beamforming," IEEE Transactions on Communications, vol. 57, no. 4, pp. 1184-1196, April 2009.

[7] J. Choi, Z. Chance, D. J. Love, and U. Madhow, "Noncoherent trellis-coded quantization for massive MIMO limited feedback beamforming," UCSD Information Theory and Applications Workshop, February 2013.

[8] J. Choi, D. J. Love, and U. Madhow, "Limited feedback in massive MIMO systems-exploiting channel correlations via noncoherent trellis-coded quantization," Proceedings of Conference on Information Sciences and Systems, March 2013.

[9] J. Choi, Z. Chance, D. J. Love, and U. Madhow, "Noncoherent Trellis Coded Quantization: A Practical Limited Feedback Technique for Massive MIMO Systems," submitted to IEEE Transactions on Communications.

[10] W. Sweldens, "Fast block noncoherent decoding," IEEE Communications Letters, vol. 5, no. 4, pp. 132-134, April 2001.

For convenience of description, the present disclosure describes a case illustrated in FIG. 1 below, in which a transmitting node has a plurality (e.g., M) of transmit antennas, and a receiving node has a single receive antenna.

FIG. 1 illustrates a transmitting node and a receiving node in a wireless communication system according to an embodiment of the present disclosure.

Referring to FIG. 1, a transmitting node 110 generates a transmission signal x[k] by processing data s[k], and transmits the transmission signal x[k]. A receiving node 120 may estimate a signal ŝ[k] from the reception signal y[k], and transmit a channel vector h[k] to the transmitting node 110. A channel forwarding the channel vector h[k] may be denoted as a 'feedback channel'. The channel vector h[k] is channel information, and the channel information may be denoted as 'Channel State Information (CSI)'.

Here, the channel vector h[k] may be quantized. The quantization represents a process of determining a codeword corresponding to the channel vector h[k] estimated in a codebook. In accordance with this, the channel information may include at least one of a channel matrix/vector, a codeword index, a Precoding Matrix Index (PMI), and a Rank Index (RI). In accordance with an embodiment of the present disclosure, the quantization may be performed based on a trellis code. In this case, the receiving node 120 may generate a binary vector b[k] of $B_{tot}$ dimension by quantizing the channel information, and transmit the binary vector b[k] to the transmitting node 110 through the feedback channel. In accordance with this, the transmitting node 110 may receive the channel information from the receiving node 120, and configure a beamforming channel vector f[k] from the binary vector b[k]. The transmitting node 110 and receiving node 120 illustrated in FIG. 1 may be configured as in FIG. 2 and FIG. 3 below.

Figure 2:
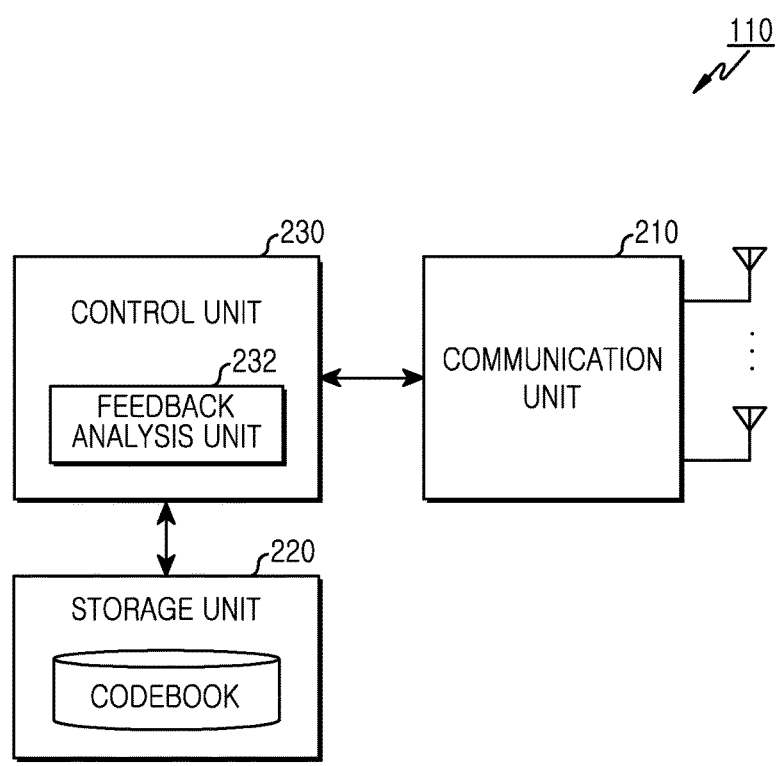
FIG. 2 illustrates a configuration of a transmitting node in a wireless communication system according to an embodiment of the present disclosure.

FIG. 2 illustrates a configuration of a transmitting node in a wireless communication system according to an embodiment of the present disclosure.

Referring to FIG. 2, the transmitting node 110 includes a communication unit 210, a storage unit 220, and a control unit 230. Terms '. . . unit', '. . . er', and the like used below represent the unit of processing at least one function or operation. This may be implemented by hardware, software, or a combination of the hardware and the software.

The communication unit 210 performs functions for transmitting/receiving a signal through a wireless channel. For example, the communication unit 210 performs a function of conversion between a baseband signal and a bit stream in accordance with a physical layer standard of a system. For example, at data transmission, the communication unit 210 generates complex symbols by encoding and modulating a transmission bit stream. In addition, at data reception, the communication unit 210 restores a reception bit stream through demodulating and decoding of a baseband signal. In addition, the communication unit 210 up converts a baseband signal into a Radio Frequency (RF) band signal and transmits the RF band signal through an antenna, and down converts an RF band signal received through the antenna into a baseband signal. For example, the communication unit 210 may include a transmission filter, a reception filter, an amplifier, a mixer, an oscillator, a Digital to Analog Converter (DAC), an Analog to Digital Converter (ADC), and the like.

In addition, the communication unit 210 may include a plurality of RF chains. Further, the communication unit 210 may perform beamforming. For the sake of beamforming, the communication unit 210 may adjust a phase and magnitude of each of signals transmitted/received through a plurality of antennas or antenna elements.

The communication unit 210 transmits and receives a signal as described above. In accordance with this, the communication unit 210 may be denoted as a transmitter, a receiver, or a transceiver.

The storage unit 220 stores data of a basic program for an operation of the transmitting node 110, an application program, setting information, and the like. More particularly, the storage unit 220 may store a codebook for beamforming of a data signal. In addition, the storage unit 220 provides the stored data in response to a request of the control unit 230.

The control unit 230 controls general operations of the transmitting node 110. For example, the control unit 230 transmits/receives a signal through the communication unit 210. In addition, the control unit 230 records data in the storage unit 220, or reads the data from the storage unit 220. For this, the control unit 230 may include at least one processor. In accordance with an embodiment of the present disclosure, the control unit 230 includes a feedback analysis unit 232 analyzing feedback information received from the receiving node 120. For example, the control unit 230 may control the transmitting node 110 to perform procedures illustrated in FIG. 7 below, FIG. 9 below, FIG. 10 below, FIG. 12 below, FIG. 21 below and the like.

Figure 3:
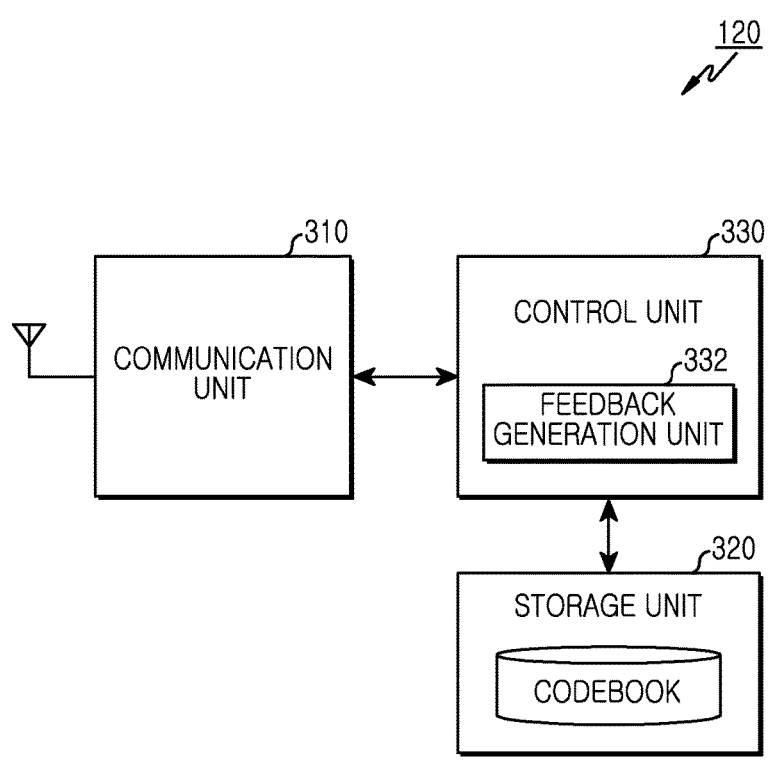
FIG. 3 illustrates a configuration of a receiving node in a wireless communication system according to an embodiment of the present disclosure.

FIG. 3 illustrates a configuration of a receiving node in a wireless communication system according to an embodiment of the present disclosure.

Referring to FIG. 3, the receiving node 120 includes a communication unit 310, a storage unit 320, and a control unit 330. Terms '... unit', '... er', and the like used below represent the unit of processing at least one function or operation. This may be implemented by hardware, software, or a combination of the hardware and the software.

The communication unit 310 performs functions for transmitting/receiving a signal through a wireless channel. For example, the communication unit 310 performs a function of conversion between a baseband signal and a bit stream in accordance with a physical layer standard of a system. For example, at data transmission, the communication unit 310 generates complex symbols by encoding and modulating a transmission bit stream. In addition, at data reception, the communication unit 310 restores a reception bit stream through demodulating and decoding of a baseband signal. In addition, the communication unit 310 up converts a baseband signal into an RF band signal and transmits the RF band signal through an antenna, and down converts an RF band signal received through the antenna into a baseband signal. For example, the communication unit 310 may include a transmission filter, a reception filter, an amplifier, a mixer, an oscillator, a DAC, an ADC, and the like. The communication unit 310 transmits and receives the signal as aforementioned. In accordance with this, the communication unit 310 may be denoted as a transmitter, a receiver, or a transceiver. In FIG. 3, the receiving node 120 has one antenna. However, in accordance with another embodiment of the present disclosure, the receiving node 120 may have a plurality of antennas.

The storage unit 320 stores data of a basic program for an operation of the receiving node 120, an application program, setting information, and the like. More particularly, the storage unit 320 may store a codebook for feedback of channel information. In addition, the storage unit 320 provides the stored data in response to a request of the control unit 330.

The control unit 330 controls general operations of the receiving node 120. For example, the control unit 330 transmits/receives a signal through the communication unit 310. In addition, the control unit 330 records data in the storage unit 320, or reads the data from the storage unit 320. For this, the control unit 330 may include at least one processor. For example, the control unit 330 may include a Communication Processor (CP) performing control for communication and an Application processor (AP) controlling an upper layer, such as an application program. In accordance with an embodiment of the present disclosure, the control unit 330 includes a feedback generation unit 332 generating feedback information for providing channel information. For example, the control unit 330 may control the receiving node 120 to perform procedures illustrated in FIG. 6 below, FIG. 8 below, FIG. 10 below, FIG. 11 below, and FIG. 21 below.

In Frequency Division Duplexing (FDD) systems, a feedback channel for channel information transmission from the receiving node 120 to the transmitting node 110 may have a limited capacity. Most limited feedback systems including $3^{rd}$ Generation Partnership Project (3GPP) Long-Term-Evolution (LTE) rely on a common Vector Quantized (VQ) codebook $C=\{c_1, c_2, \ldots c_2{}^{B_{tot}}\}$. The VQ codebook may be shared between the transmitting node 110 and the receiving node 120. Here, $c_i$ is M×1 complex vectors with $\|c_i\|^2=1$ for all i. With the VQ codebook approach, the receiving node 120 may select an optimal codeword as in Equation 1 below.

$$C_{opt} = \mathrm{argmax}_{c \in C} |h^H c|^2 \quad \text{Equation 1}$$

In Equation 1 above, the '$C_{opt}$' denotes an optimal codeword, the 'C' denotes a codebook, the 'c' denotes a codeword within the codebook, and the h denotes a channel vector.

The optimal codeword may be determined by exhaustive search. However, the exhaustive search is feasible only when the total number of codewords is small (e.g., $B_{tot}$=4), as in LTE systems. The computational complexity of the exhaustive search for the optimal codeword is given as $O(M2)^{B_{tot}}$, and is exponentially increases for the number of codewords. For example, because of the rapid growth of the computational complexity of the exhaustive search dependent on an increase of the number of codewords, it is not possible to perform the exhaustive search for a codebook having a large $B_{tot}$ in real time.

In order for an error of quantization of channel information to have a specific level, the number of bits for the codebook should increase in proportion to the number of transmission antennas. With a Random Vector Quantization (RVQ) codebook, which is an optimal VQ codebook having a fixed ratio $$\frac{B_{tot}}{M} = B$$

when $M \to \infty$ and $B_{tot} \to \infty$, a loss in a normalized beamforming gain may be given in Equation 2 below, as given in the [1].

$$L(M, B_{tot}) = 1 - E[\bar{h}^H c_{opt}] \approx 2^{-\frac{B_{tot}}{M-1}} \quad \text{Equation 2}$$

In Equation 2 above, the 'M' denotes the number of antennas, the '$B_{tot}$' denotes a codeword size, i.e., the number of bits of a codeword index, the $$`\bar{h} = \frac{h}{\|h\|}`$$

denotes a normalized channel vector, and the '$c_{opt}$' denotes an optimal codeword.

Referring to Equation 2 above, it is obvious that the feedback overhead is increased proportional to 'M' to maintain the normalized beamforming loss in a certain level. Therefore, the method of using a VQ codebook combined with the exhaustive search according to the related art is not practical in massive MIMO systems mainly because of the complexity issue.

One method for addressing this issue is to quantize the channel vector in a block manner. For example, the receiving node 120 may truncate M×1 channel vectors into N blocks. Here, the 'M/N' is an integer. Thereafter, the receiving node 120 may quantize N×1 blocks separately with N×1 quantization bits per block. This can relax the complexity of CSI quantization effectively. Recently, Trellis-Extended Codebook (TEC) and Trellis-Extended Successive Phase Adjustment (TE-SPA) have been proposed as the block-wise quantization strategy of the [2].

At this time, it is desirable that a channel vector and antenna array structure is considered. In a planar antenna array case, different CSI quantization strategies may be carried out by exploiting the structure of planar antenna array. The channel vector of planar antenna array may be expressed as in Equation 3 below.

$$h = h_v \otimes h_h \quad \text{Equation 3}$$

In Equation 3 above, the 'h' denotes a channel vector, the '$h_v$' denotes a channel vector expressing a vertical domain, and the '$h_h$' denotes a channel vector expressing a horizontal domain. In addition, $h_v \in C^{M_v}$, and $h_h \in C^{M_h}$. Here, the $C^{M_h}$ denotes $M_h \times 1$ vector sets consisting of a complex number, and the $C^{M_v}$ denotes $M_v \times 1$ vector sets consisting of the complex number.

As in the papers [3] to [5], the approximation may be based on the approximation results of the spatial correlation matrix of planar antenna array. The product of the dimensions of $h_v$ and $h_h$ is equal to the M elements of the channel vector, i.e., satisfies $M = M_v \times M_h$. In this case, the easiest and most straight forward method of quantizing CSI is to rely on the Kronecker product codebook. In the Kronecker product codebook case, the receiving node 120 may quantize the horizontal and vertical channel domains separately using common or possibly different codebooks. At this time, the codewords for the horizontal and vertical domains may be determined as in Equation 4 below.

$$c_v = \underset{c \in C_v}{\operatorname{argmax}} |h_v^H c|^2 \quad \text{Equation 4}$$
$$c_h = \underset{c \in C_h}{\operatorname{argmax}} |h_h^H c|^2$$

In Equation 4 above, the '$c_v$' denotes a codeword for a vertical domain, the '$c_h$' denotes a codeword for a horizontal domain, the 'c' denotes a codeword candidate, the '$h_v$' denotes a channel vector expressing the vertical domain, and the '$h_h$' denotes a channel vector expressing the horizontal domain. In addition, $h_v \in C^{M_v}$, and $h_h \in C^{M_h}$. Here, the $C^{M_h}$ denotes $M_h \times 1$ vector sets consisting of a complex number, and the $C^{M_v}$ denotes $M_v \times 1$ vector sets consisting of the complex number.

Once the receiving node 120 feeds back indices of both codewords to the transmitting node 110, the transmitting node 110 may generate the M×1 quantized channels. The quantized channel is given as in Equation 5 below.

$$c = c_v \otimes c_h \quad \text{Equation 5}$$

In Equation 5 above, the 'cv' denotes a codeword for a vertical domain, the 'ch' denotes a codeword for a horizontal domain, and the 'c' denotes a codeword for the whole channel.

As described above, the channel vector may be expressed with a vertical domain or horizontal domain. Accordingly, in accordance with various embodiments of the present disclosure, the receiving node 120 may transmit additional feedback information indicating a preferred domain. For example, the additional information may consist of 1 bit. The additional feedback information may be transmitted in long-term or short-term depending on a state of the receiving node 120 or the transmitting node 110. For example, if the receiving node 120 moves around in a ground level, then it may prefer to select the horizontal domain. Otherwise, if the receiving node 120 is in a tall building, walking down the stairs, it may prefer to choose the vertical domain. Based on the selected domain, the receiving node 120 re-indexes the channel entries to be quantized to have better directivity of the channel. In accordance with this, better CSI quantization results may be obtained by adapting the channel to the preferred domain.

For explanation purpose, a 4×8 planar antenna array including 32 antenna elements is described. Each effective antenna element may be comprised of four physical antenna elements. However, the various embodiments of the present disclosure may be embodied for antenna arrays comprised of the different number of antenna elements. With this planar antenna array, the antenna elements may be indexed as in FIG. 4 below.

Figure 4:
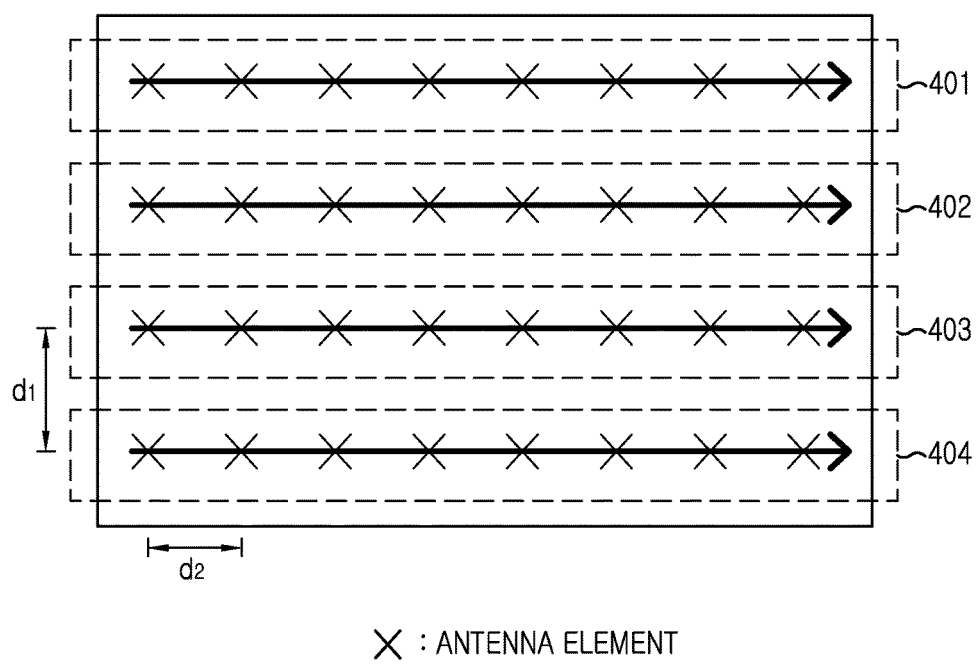
FIG. 4 illustrates an index method of antenna elements in a wireless communication system according to an embodiment of the present disclosure.

FIG. 4 illustrates an index method of antenna elements in a wireless communication system according to an embodiment of the present disclosure. In FIG. 4, one antenna element represents an effective antenna element.

Referring to FIG. 4, eight antenna elements are arranged in a first column 401, and eight antenna elements are arranged in a second column 402, and eight antenna elements are arranged in a third column 403, and eight antenna elements are arranged in a fourth column 404. An interval between vertical orientations between antenna elements is $d_1$, and an interval between horizontal orientations is $d_2$. At this time, the antenna elements may be indexed with horizontal orientations priority as in the direction of an arrow illustrated in FIG. 4. In accordance with this, the first column 401 includes antenna elements of indices 1 to 8, and the second column 402 includes antenna elements of indices 9 to 16, and the third column 403 includes antenna elements of indices 17 to 24, and the fourth column 404 includes antenna elements of indices 25 to 32. At this time, a channel vector indexed in the same method as the antenna elements may be expressed as $[h_1, \ldots h_{s2}]^T$.

Hereinafter, for description convenience, a case in which a channel vector is quantized in a block-wise manner using a 4TX codebook. However, various embodiments of the present disclosure may be applied even to block-wise channel information quantization of any other way.

Standard codebooks, such as LTE or Discrete Fourier Transform (DFT) codebook have good directivity. Thus, it is better to quantize the channel vector using codewords from these codebooks taking the preferred domain into account. Considering the planar antenna array structure in FIG. 4, the preferred domain selection may be achieved as follows.

Two candidate codewords, i.e., a first candidate and a second candidate may be selected from a codebook.

$$c_{opt,1} = \underset{c \in C}{\arg\max} |h^H c|^2$$
$$c_{opt,2} = \underset{c \in C}{\arg\max} |g^H c|^2$$

Equation 6

In Equation 6 above, the 'C' denotes a codebook, the 'c' denotes a codeword within the codebook, the 'h' denotes a channel vector, the $g=[h_{p,1}^T, h_{p,2}^T \ldots h_{p,8}^T]^T$ denotes an arbitrary perturbed channel vector, and is $h_{p,k} \in C^4 (k=1, \ldots 8,)$, and the '$C_{opt,1}$' denotes a first candidate of a codeword corresponding to the 'h', and the '$C_{opt,2}$' denotes a second candidate of a codeword corresponding to the 'g'.

Each block $h_{p,k}$ may be quantized using 4Tx LTE or DFT codebook. If different codebooks, such as 2Tx or 8Tx codebook are adopted for CSI quantization, then the block size may be changed appropriately. The receiving node 120 may compare two metrics using the first candidate and the second candidate. The metrics may be compared as in Expression 7 below.

$$|h^H c_{opt,1}|^2 \geq |g^H c_{opt,2}|^2$$

Expression 7

In Expression 7 above, the 'h' denotes a channel vector indexed with horizontal orientation priority, the 'g' denotes a channel vector indexed with vertical orientation priority, and the '$c_{opt,1}$' denotes a first candidate of a codeword corresponding to the 'h', and the '$c_{opt,2}$' denotes a second candidate of a codeword corresponding to the 'g'.

In accordance with the comparison result, additional information indicating which codeword is fed back among the first candidate and the second candidate may be transmitted. For example, the receiving node 120 may select one of the first candidate and the second candidate in accordance with the comparison result, and transmit the selected channel information to the transmitting node 110. Here, the channel information is information representing the selected codeword or codewords, and may include an index of at least one codeword or values generated from the index. The values generated from the index may consist of the number of bits less than the index.

The physical meaning of the aforementioned processes is given as follows.

Figures 5A, 5B:
FIGS. 5A and 5B illustrate mapping methods of antenna elements in a wireless communication system according to an embodiment of the present disclosure.

FIGS. 5A and 5B illustrate mapping methods of antenna elements in a wireless communication system according to an embodiment of the present disclosure. FIGS. 5A and 5B illustrate mappings between an antenna element and a codeword according to a selected domain. FIG. 5A illustrates a case where a horizontal domain is selected, and FIG. 5B illustrates a case where a vertical domain is selected.

Referring to FIG. 5A, when the horizontal domain is selected, each codeword from a codebook is mapped to a group of four antenna elements adjacent in horizontal orientation. In other words, the antenna group includes antenna elements adjacent in horizontal orientation. For example, if the horizontal domain is selected, channel values by antenna element included in a channel vector are indexed with horizontal orientation priority.

Referring to FIG. 5B, when the vertical domain is selected, each codeword from a codebook is mapped to a group of four antenna elements adjacent in vertical orientation. In other words, the antenna group includes antenna elements adjacent in vertical orientation. For example, if the vertical domain is selected, channel values by antenna element included in a channel vector are indexed with vertical orientation priority. By mapping as illustrated in FIGS. 5A and 5B, a final selected codeword has greater orientation in the selected domain.

Figure 6:
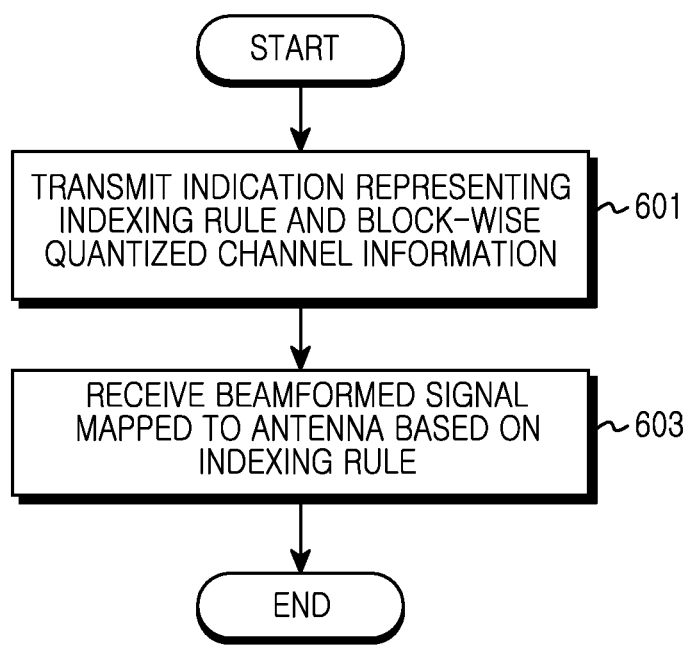
FIG. 6 illustrates an operation procedure of a receiving node in a wireless communication system according to an embodiment of the present disclosure.

FIG. 6 illustrates an operation procedure of a receiving node in a wireless communication system according to an embodiment of the present disclosure. FIG. 6 illustrates an operation method of the receiving node 120.

Referring to FIG. 6, in operation 601, the receiving node transmits an indication representing an indexing rule and block-wise quantized channel information. The indexing rule represents an array order within a channel vector of channel values configuring the channel vector. In other words, the indexing rule represents an indexing order of channel values, i.e., channel entries at the time of codeword determination corresponding to channel information in the receiving node. In other words, the indexing rule represents a corresponding relation between channel values included in the channel vector used at codeword determination and the antenna elements. For example, the channel information includes indices of codewords for each antenna group, and the indication signifies information indicating a preferred domain used at determination of the codewords. Here, the preferred domain includes a vertical domain or a horizontal domain. In other words, the indication indicates whether the antenna elements are grouped with the horizontal orientation priority at codeword determination or whether the antenna elements are grouped with the vertical orientation priority.

Thereafter, the receiving node proceeds to operation 603 and receives a beamformed signal mapped to antennas based on the indexing rule. The beamforming is performed by a transmitting node, and signals beamformed with a plurality of codewords are transmitted through antennas determined based on the indexing rule. For example, in mapping the beamformed signal, the transmitting node maps the beamformed signals to the antenna elements with the vertical orientation priority or horizontal orientation priority based on the indexing rule.

Figure 7:
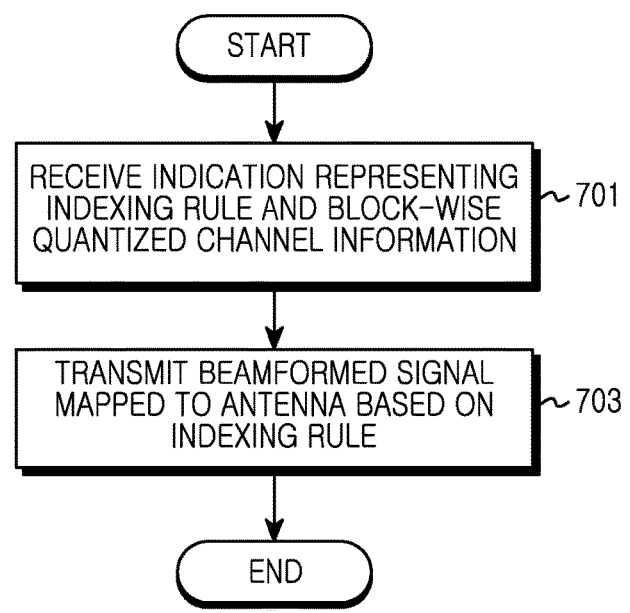
FIG. 7 illustrates an operation procedure of a transmitting node in a wireless communication system according to an embodiment of the present disclosure.

FIG. 7 illustrates an operation procedure of a transmitting node in a wireless communication system according to an embodiment of the present disclosure. FIG. 7 illustrates an operation method of the transmitting node 110.

Referring to FIG. 7, in operation 701, the transmitting node receives an indication representing an indexing rule and block-wise quantized channel information. The indexing rule represents an indexing order of channel values, i.e., channel entries at the time of codeword determination corresponding to channel information in a receiving node. In other words, the indexing rule represents a corresponding relation between channel values included in the channel vector used at codeword determination and the antenna elements. For example, the channel information includes indices of codewords for each antenna group, and the indication signifies information indicating a preferred domain used at determination of the codewords. Here, the preferred domain includes a vertical domain or a horizontal domain. In other words, the indication indicates whether the antenna elements are blocked with the horizontal orientation priority at codeword determination or whether the antenna elements are blocked with the vertical orientation priority.

Thereafter, the transmitting node proceeds to operation 703 and transmits a beamformed signal mapped to antennas based on the indexing rule. The beamforming is performed by the transmitting node, and signals beamfomed with a plurality of codewords are transmitted through antennas determined based on the indexing rule. For example, in mapping the beamformed signal, the transmitting node maps the beamformed signals to the antenna elements with the vertical orientation priority or horizontal orientation priority based on the indexing rule.

Figure 8:
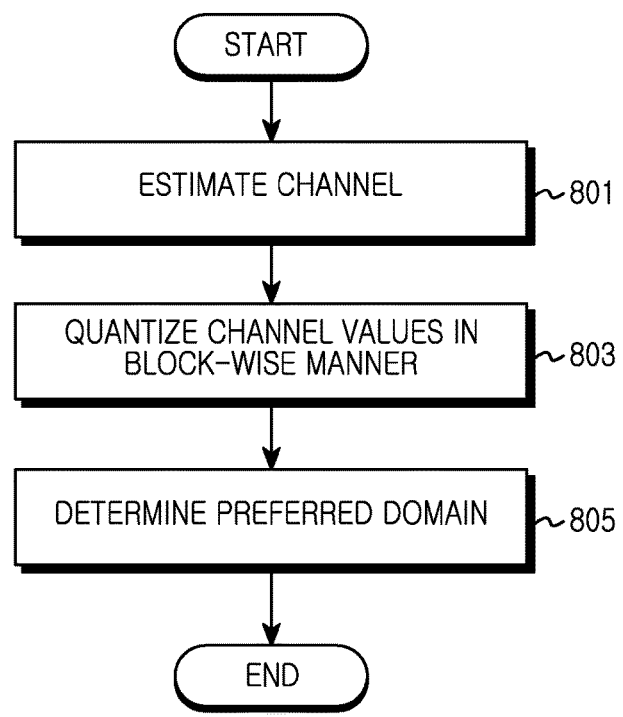
FIG. 8 illustrates a codeword determination procedure of a receiving node in a wireless communication system according to an embodiment of the present disclosure.

FIG. 8 illustrates a codeword determination procedure of a receiving node in a wireless communication system according to an embodiment of the present disclosure. FIG. 8 illustrates an operation method of the receiving node 120.

Referring to FIG. 8, in operation 801, the receiving node estimates a channel between a transmitting node and the receiving node. For this, the receiving node may receive a signal transmitted in the transmitting node. The signal may include at least one of a pilot signal, a reference signal, a training signal, a synchronization signal, and a preamble. At this time, the channel may be comprised of a matrix or vector of a size corresponding to the number of antennas of the transmitting node and the number of antennas of the receiving node. Hereinafter, for description convenience, it is assumed that the channel has a form of a vector.

Thereafter, the receiving node proceeds to operation 803 and quantizes channel values in a block-wise manner. Specifically, the receiving node blocks by truncating a channel vector consisting of channel entries, i.e., channel values as much as the number of antenna elements included in an antenna array of the transmitting node, and determines an optimal codeword for each block. Here, the size of the block may be different in accordance with a size of a used codebook. At this time, the receiving node quantizes each of a plurality of channel vectors arranging the channel values in accordance with a plurality of domains, in other words, with horizontal orientation priority and vertical orientation priority. In accordance with this, the channel values may be blocked to correspond to antenna elements grouped as in FIG. 5A or FIG. 5B. As a result, as many quantization results as the number of selectable domains are obtained.

Thereafter, the receiving node proceeds to operation 805 and determines a preferred domain. For example, the receiving node selects channel information whose beamforming gain is larger among quantized channel information corresponding to each domain, and determines a domain corresponding to the selected channel information as the preferred domain. For example, the receiving node may select the channel information, i.e., codewords maximizing a size of an effective channel. Specifically, if a condition, such as Expression 7 above is satisfied, the receiving node may select a horizontal domain as the preferred domain.

Figure 9:
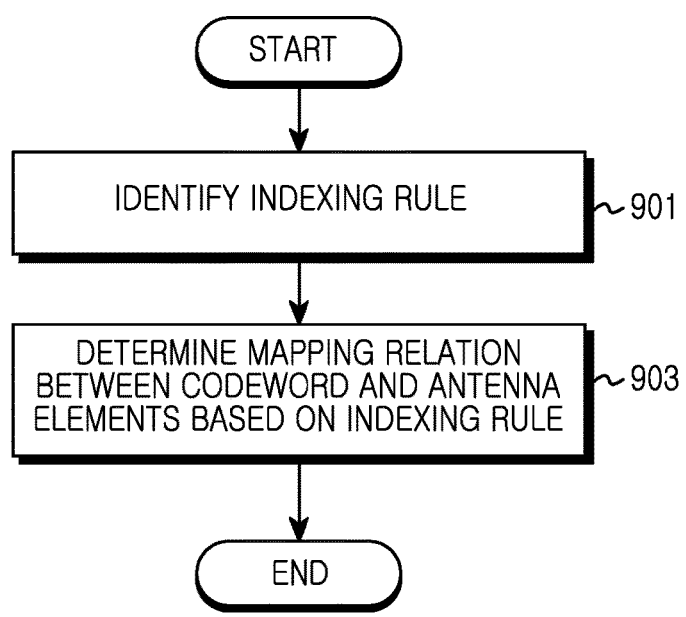
FIG. 9 illustrates a mapping relation determination procedure of a transmitting node in a wireless communication system according to an embodiment of the present disclosure.

FIG. 9 illustrates a mapping relation determination procedure of a transmitting node in a wireless communication system according to an embodiment of the present disclosure. FIG. 9 illustrates an operation method of the receiving node 110.

Referring to FIG. 9, in operation 901, the transmitting node identifies an indexing rule for channel information fed back from the receiving node. The indexing rule represents an indexing order of channel values, i.e., channel entries within a channel vector used at the time of codeword determination corresponding to channel information in the receiving node. The transmitting node may identify the indexing rule through an indication fed back from the receiving node. Through this, the transmitting node may determine a preferred domain of the receiving node.

Thereafter, the transmitting node proceeds to operation 903 and determines a mapping relation between codewords and antenna elements based on the indexing rule. The indexing rule represents a corresponding relation between channel values included in the channel vector used at codeword determination and the antenna elements. Accordingly, the transmitting node may determine whether to apply signals beamformed with one codeword to an antenna group of vertical orientation, or whether to apply the signals to an antenna group of horizontal orientation, in accordance with a domain of the channel vector indicated by the indexing rule. In other words, the transmitting node determines if each of codewords indicated by the fed back channel information corresponds to a channel of which antenna elements, based on the indexing rule. For example, if the indexing rule indicates the horizontal domain, one codeword corresponds to an antenna group, such as FIG. 5A. In contrast, if the indexing rule indicates the vertical domain, one codeword corresponds to an antenna group, such as FIG. 5B.

Figure 10:
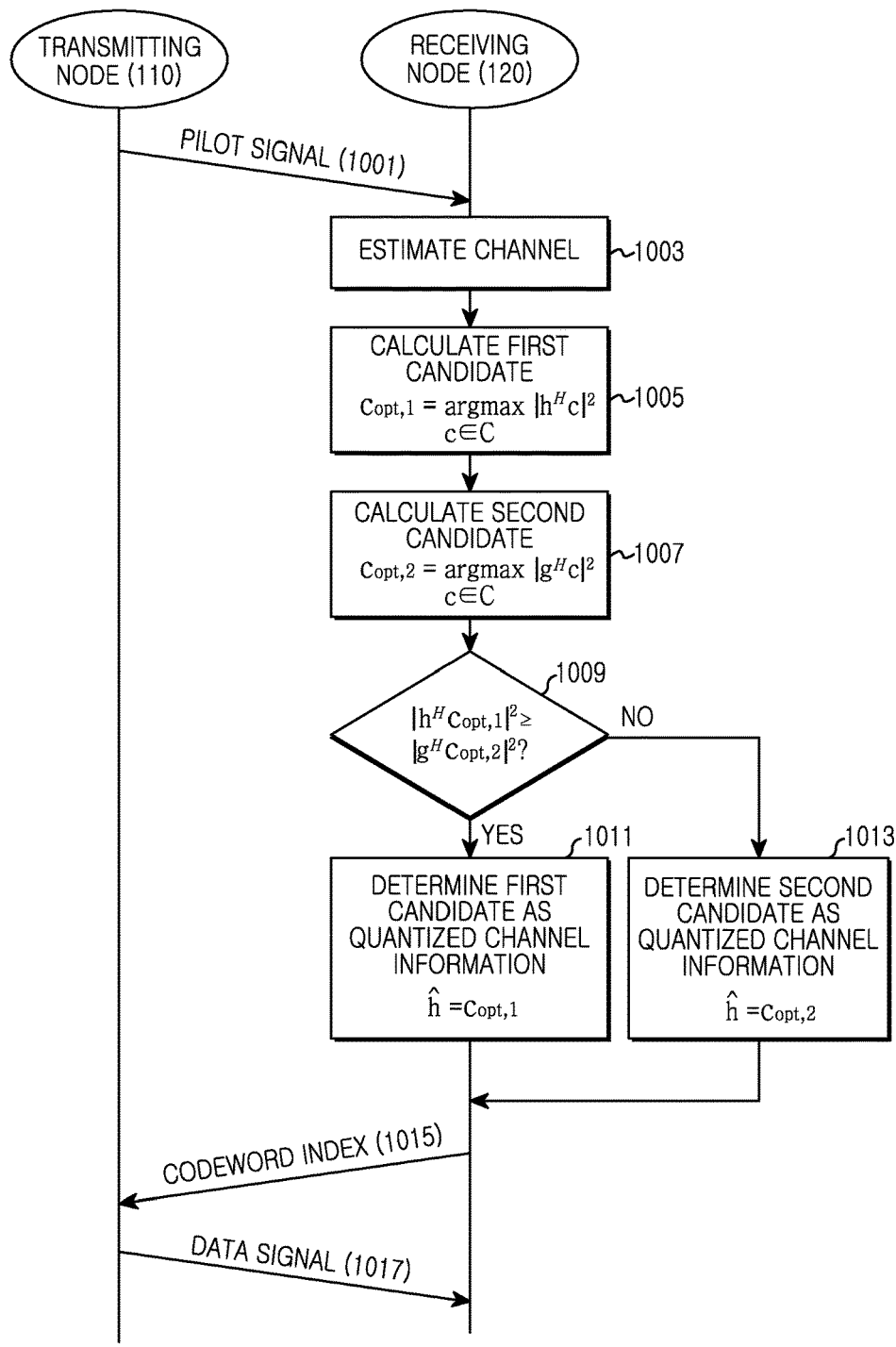
FIG. 10 illustrates a channel information feedback procedure in a wireless communication system according to an embodiment of the present disclosure.

FIG. 10 illustrates a channel information feedback procedure in a wireless communication system according to an embodiment of the present disclosure. For example, the procedure illustrated in FIG. 6 may be performed by the transmitting node 110 and the receiving node 120.

Referring to FIG. 10, in operation 1001, the transmitting node 110 transmits a pilot signal to the receiving node 120. The pilot signal is a signal for channel estimation, and may have a predefined value, and may be transmitted through a predefined resource. The pilot signal may be denoted as a reference signal, a training signal, and the like, and may be replaced with a synchronization signal, a preamble and the like.

In operation 1003, the receiving node 120 estimates a channel between the transmitting node 110 and the receiving node 120. The channel may consist of a matrix or vector of a size corresponding to the number of antennas of the transmitting node 110 and the number of antennas of the receiving node 120. Hereinafter, for description convenience, it is assumed that the channel consists of a vector.

In operation 1005, the receiving node 120 calculates a first candidate of a codeword corresponding to the channel. The codeword may be denoted as a precoding matrix, a beamforming matrix and the like. At this time, the first candidate signifies a codeword determined based on a channel vector of a case of arranging channel values within the channel vector with horizontal orientation priority. For example, in a planar antenna array of FIG. 4, the channel vector includes the channel values in order of antenna element indices 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32. At this time, the receiving node 120 may decide a codeword maximizing a size of an effective channel, as the first candidate. Specifically, the receiving node 120 may decide a codeword maximizing the square of the product with Hermitian of the horizontal domain channel vector, as the first candidate.

In operation 1007, the receiving node 120 calculates a second candidate of a codeword corresponding to the channel. The codeword may be denoted as a precoding matrix, a beamforming matrix, and the like. At this time, the second candidate signifies a codeword determined based on a channel vector of a case of arranging channel values within the channel vector with vertical orientation priority. For example, in a planar antenna array of FIG. 4, the channel vector includes the channel values in order of antenna element indices 1, 9, 17, 25, 2, 10, 18, 26, 3, 11, 19, 27, 4, 12, 20, 28, 5, 13, 21, 29, 6, 14, 22, 30, 7, 15, 23, 31, 8, 16, 24, 32. At this time, the receiving node 120 may decide a codeword maximizing a size of an effective channel, as the second candidate. Specifically, the receiving node 120 may decide a codeword maximizing the square of the product with Hermitian of the vertical domain channel vector, as the second candidate.

In operation 1009, the receiving node 120 selects one of the first candidate and the second candidate. For this, the receiving node 120 may compare metrics corresponding to the first candidate and the second candidate. Here, the metric is a size of an effective channel, and may be defined as the square of the product with Hermitian of the channel vector. If the metric of the first candidate is equal to or is greater than the metric of the second candidate, the receiving node 120 selects the first candidate. In contrast, if the metric of the first candidate is less than the metric of the second candidate, the receiving node 120 selects the second candidate.

If the first candidate is selected, in operation 1011, the receiving node 120 determines the first candidate as quantized channel information. In contrast, if the second candidate is selected, in operation 1013, the receiving node 120 determines the second candidate as the quantized channel information. At this time, the quantized channel information represents a plurality of codewords matching with channel blocks on a point-to-point basis. The channel information may directly indicate indices of the plurality of codewords, or include values generated from the indices. For example, the channel information may include information processing the indices based on trellis code.

Thereafter, in operation 1015, the receiving node 120 transmits the quantized channel information to the transmitting node. In other words, the receiving node 120 feeds back channel information representing codeword indices. For example, the receiving node 120 transmits indices of a plurality of codewords for each of antenna groups. At this time, in accordance with an embodiment of the present disclosure, the receiving node 120 may transmit together additional feedback information indicating if the transmitted channel information has been generated based on a horizontal domain channel vector or if the channel information has been generated based on a vertical domain channel vector. Alternatively, in accordance with another embodiment of the present disclosure, the receiving node 120 may transmit the additional feedback information prior to transmission of the channel information.

In operation 1017, the transmitting node 110 transmits a data signal using the fed back channel information. In other words, the transmitting node 110 may beamform the data signal using the codeword indicated by the codeword indices, and transmit the beamformed data signal. At this time, the transmitting node 110 determines a mapping relation between codewords and antenna elements based on an indication fed back together with the channel information or apart from the channel information. For example, the indication indicates whether channel values have been indexed based on which domain at codeword determination in the receiving node 120. In accordance with this, the transmitting node 110 may decide the mapping relation between the codewords and the antenna elements based on the indication, and transmit the beamformed signal mapped to the antenna elements in accordance with the mapping relation.

In the procedure described with reference to FIG. 10, operation 1011 and operation 1013 of quantizing the channel information may include the processes of truncating the channel information and codewords included in a codebook into blocks of a plurality of channel vectors and groups of a plurality of codewords, and trellis-coded quantizing the blocks of the channel vectors using the groups of the codewords. At this time, according to an embodiment of the present disclosure, the method of trellis-coded quantizing the channel information may include truncating the channel information and the codewords into the blocks of the M/L channel vectors and the groups of the codewords. The 'M' is the number of the whole antenna elements of the transmitting node 110, and the 'L' is the number of antenna elements per group. In addition, according to an embodiment of the present disclosure, the method of trellis-coded quantizing the channel information may include assigning the groups of the respective codewords to outputs of a trellis structure corresponding to a predefined convolutional encoder, and searching a path for the trellis structure, and outputting information representing an optimal codeword corresponding to the optimal path as the path search result, as the quantization result corresponding to the blocks of the respective channel vectors.

Here, according to an embodiment of the present disclosure, the method of searching the path may include searching the path for the trellis structure within a predefined search range among the whole search range. According to an embodiment of the present disclosure, the method of assigning the groups of the respective codewords to the outputs of the trellis structure corresponding to the predefined convolutional encoder may include assigning the groups of the respective codewords to the outputs of the trellis structure such that a minimum Euclidean distance between codewords assigned to an odd number output and an even number output of the trellis structure is maximized. According to an embodiment of the present disclosure, the convolutional encoder includes one of a 3/4 rate convolutional encoder, a 2/3 rate convolution encoder, or a convolution coder with an arbitrary rate.

As described above, the receiving node according to various embodiments of the present disclosure may feed back channel information configured in block-wise manner, i.e., indices of codewords by antenna group. Further, the receiving node may further transmit an indexing rule for channel values included in a channel vector used at the time of determination of codewords. At this time, the channel information may be quantized. The quantization may be carried out based on a trellis code. Hereinafter, embodiments of the present disclosure further describe the quantization.

As in the [6] to [9], new methods of quantizing the channel vector with a low complexity in Multiple-Output Single-Output (MISO) systems were proposed. The proposed schemes in the [6] to [9] rely on the duality of the beamforming VQ problem and the noncoherent sequence detection problem in Additive White Gaussian Noise (AWGN) channels. The duality shows that the two problems are equivalent with Equation 8 below.

$$\underset{c \in C}{\operatorname{argmax}} |h^H c|^2 = \underset{c \in C}{\operatorname{argmin}} \min_{\theta \in [0, 2\pi)} \|h - e^{j\theta} c\|^2 \qquad \text{Equation 8}$$

In Equation 8 above, the 'C' denotes a codebook, the 'c' denotes a codeword within the codebook, and the 'h' denotes a channel vector.

Referring to Equation 8 above, the left hand side is the beamforming VQ problem and the right hand side is the noncoherent sequence detection problem. In the case of the noncoherent sequence detection problem, the 'h' is the received signal, the '$e^{j\theta}$' is the channel coefficient (assuming block fading with unit amplitude), and the 'c' is the candidate transmitted codeword.

Various embodiments of the present disclosure include a method of generating TEC using a codebook, and using the generated TEC in trellis-coded quantization, and a TE-SPA method of adjusting a phase for the trellis-coded quantized result. These methods are similar to W=W1W2 structure in 3GPP LTE-Advanced 8 transmit (Tx) antennas codebook. Here, the W1 is wideband/long-term channel information and the W2 is subband/short-term channel information. The TEC and TE-SPA can be thought as W1 and W2, respectively.

In describing the TEC, LTE 4Tx codebook is described. However, any other VQ codebook, such as DFT, RVQ, and Grassmannian-Line-Packing (GLP) codebook, can be also used.

A feature of the receiving node for quantization of the channel information is described as follows.

The receiving node according to an embodiment of the present disclosure may store a codebook. For example, the codebook may be 3GGP LTE 4TD codebook, such as Table 1 below.

The receiving node trellis-coded quantizes channel information using a selected codebook among a plurality of codebooks stored in the codebook. The receiving node truncates the channel information and codewords included in the selected codebook into blocks of a plurality of channel vectors and groups of a plurality of codewords, respectively, and trellis-coded quantizes the blocks of the respective channel vectors using the groups of the respective codewords. In one embodiment of the present disclosure, the receiving node truncates the channel information and the codewords into the blocks of the channel vectors of predefined number and the groups of the codewords. In an embodiment of the present disclosure, the receiving node assigns the groups of the respective codewords to outputs in a trellis structure corresponding to a predefined convolutional code, and searches a path for the trellis structure, and outputs information representing an optimal codeword corresponding to the optimal path as the path search result, as a quantization result corresponding to the blocks of the respective channel vectors. In an embodiment of the present disclosure, the receiving node searches the path for the trellis structure in a predefined search range (e.g., $\theta \in \Theta = \{\theta_1, \ldots \theta_K\}$, $$\theta_k = \frac{2(k-1)\pi}{K})$$

among the whole search range (e.g., $[0, 2\pi)$). In an embodiment of the present disclosure, the receiving node assigns the groups of the respective codewords to the outputs in the trellis structure such that a minimum Euclidean distance between codewords assigned to an odd number output and even number output of the trellis structure is maximized. Here, the convolutional encoder may include one of a 3/4 rate convolutional encoder, a 2/3 rate convolutional encoder, or a convolutional encoder having an arbitrary rate.

A feature of the transmitting node for processing the quantized channel information is described as follows.

TABLE 1

| Codebook | | Number of layers υ | | | |
|---|---|---|---|---|---|
| index | $u_n$ | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 1 above, the '$W_n^{\{s\}}$' denotes the matrix defined by the columns given by the set $\{s\}$ from the expression $W_n = I - 2u_n u_n^H / u_n^H u_n$. Here, the T is the 4×4 identity matrix and the vector '$u_n$' is given as shown in Table 1 above. The '$C_{LTE,1}$' as the 4Tx rank one LTE codebook are given as $C_{LTE,1} = \{W_k^{\{1\}}\}_{k=0}^{15}$.

The transmitting node receives quantized channel information. For example, the transmitting node receives feedback information including trellis-coded quantized channel information. The feedback information is generated by trellis-coded quantizing the channel information using a codebook selected among a plurality of codebooks by the receiving node. In addition, in an embodiment of the present disclosure, the method of trellis-coded quantizing includes the processes of assigning the groups of the respective codewords to outputs of a trellis structure corresponding to the convolutional encoder, and searching a path for the trellis structure, and outputting information representing an optimal codeword corresponding to the optimal path as the path search result, as the quantization result corresponding to the blocks of the respective channel vectors. In an embodiment of the present disclosure, the method of searching the path includes searching the path for the trellis structure within a predefined search range among the whole search range. In an embodiment of the present disclosure, the groups of the respective codewords are assigned to the outputs of the trellis structure such that a minimum Euclidean distance between codewords assigned to an odd number output and an even number output of the trellis structure is maximized. The transmitting node convolution codes the feedback information. The transmitting node convolution-encodes the feedback information. The convolutional encoder may include one of a 3/4 rate convolutional encoder, a 2/3 rate convolution encoder, or a convolution coder with an arbitrary rate. In addition, the transmitting node maps the convolutional coding result to codewords according to a predefined mapping rule. In addition, the transmitting node reconfigures a channel vector in accordance with the mapped codewords.

Figure 11:
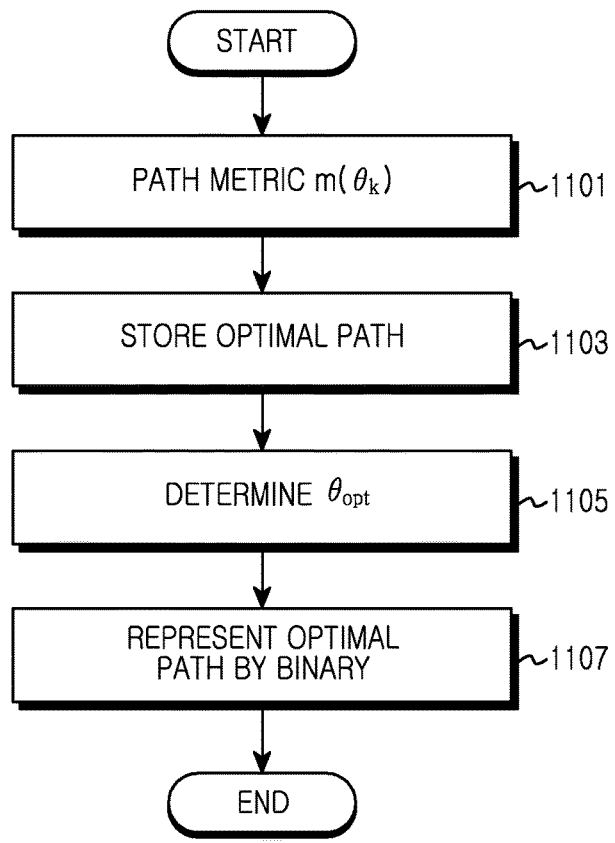
FIG. 11 illustrates a channel information quantization procedure of a receiving node of a wireless communication system according to an embodiment of the present disclosure.

FIG. 11 illustrates a channel information quantization procedure of a receiving node of a wireless communication system according to an embodiment of the present disclosure. FIG. 11 illustrates a channel information quantization method of the receiving node 120.

Referring to FIG. 11, in operation 1101, the receiving node minimizes a path metric using the Viterbi algorithm. For example, the receiving node may minimize the path metric as in Equation 9 below for a channel vector 'h' with a given $\theta_k \in \Theta = \{\theta_1 \ldots \theta_K\}$.

$$m(\theta_k) = \min_{c_{[L(t-1)+1:Lt]} \in C_{LTE,1}} \sum_{t=1}^{M/L} \|h_{[L(T-1)+1:Lt]} - e^{j\theta\theta} c_{[L(t-1)+1:Lt]}\|^2 \quad \text{Equation 9}$$

In Equation 9 above, the m ($\theta_k$) denotes a minimal value of the path metric, the 'L' denotes a block size, the 'M' denotes the number of antennas, the 'c[m:n]' denotes a truncated vector from an mth entry of a codeword 'c' to an nth entry, the '$C_{LTE,1}$' denotes a codebook, the 'h[m:n]' denotes a truncated vector from an mth entry of a channel vector 'h' to an nth entry.

Thereafter, the receiving node proceeds to operation 1103 and stores the optimal path providing a minimal value m ($\theta_k$) of the path metric. In addition, the receiving node proceeds to operation 1105 and selects $\theta_{opt}$ providing a minimal value among minimal values m($\theta_k$) for $\theta_k \in \Theta = \{\theta_1, \ldots \theta_K\}$. For example, the receiving node may select the $\theta_{opt}$ as in Equation 10 below.

$$\theta_{opt} = \underset{\theta_k \in \Theta}{\arg\min}\, m(\theta_k) \quad \text{Equation 10}$$

In Equation 10 above, the '$\theta_{opt}$' denotes the optimal path, the '$\theta_k$' denotes a kth path, the '$\Theta$' denotes a set of paths, and the '$m(\theta_k)$' denotes a minimal value of a path metric.

Thereafter, the receiving node proceeds to operation 1107 and expresses the optimal path of m($\theta_{opt}$) with a binary value '$b_{opt}$'. The binary value configures an input, not an output of the optimal path in trellis.

Figure 12:
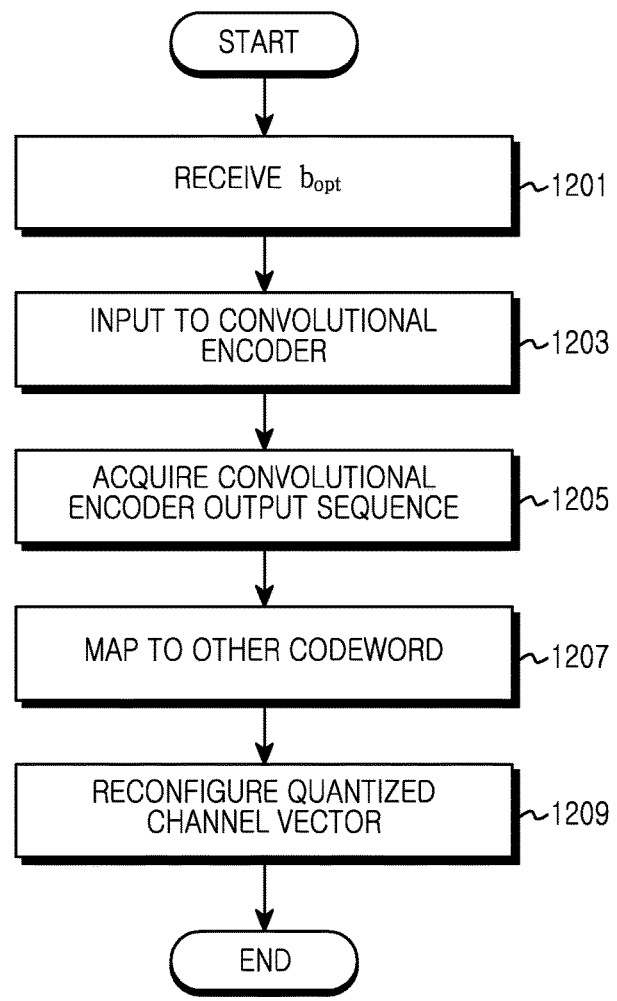
FIG. 12 illustrates a channel vector reconfiguration procedure of a transmitting node of a wireless communication system according to an embodiment of the present disclosure.

FIG. 12 illustrates a channel vector reconfiguration procedure of a transmitting node of a wireless communication system according to an embodiment of the present disclosure. FIG. 12 illustrates a channel vector reconfiguration method of the transmitting node 110.

Referring to FIG. 12, in operation 1201, the transmitting node receives a binary value '$b_{opt}$' included in feedback information from a receiving node. The transmitting node proceeds to operation 1203 and inputs the received binary value '$b_{opt}$' to a convolutional encoder. In addition, the transmitting node proceeds to operation 1205 and acquires an output sequence of the convolutional encoder. In other words, the convolutional encoder outputs a sequence corresponding to the binary value '$b_{opt}$'. Thereafter, the transmitting node proceeds to operation 1207 and maps an output sequence of the convolutional encoder to a codeword (e.g., LTE codeword) in accordance with a predefined mapping rule. Thereafter, the transmitting node proceeds to operation 1209 and reconfigures a channel vector based on the mapping result.

Examples of trellis-coded quantization operation using a trellis extended codebook according to an embodiment of the present disclosure are described with reference to FIG. 13 to FIG. 20 below. In describing this quantization operation, a TEC using LTE 4TX codebook, such as Table 1 above, will be used.

Figure 13:
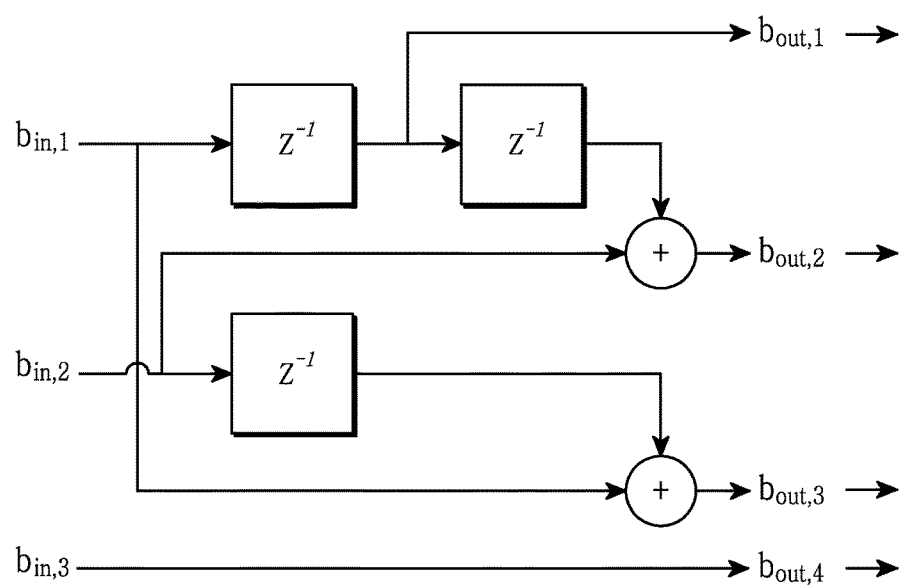
FIG. 13 illustrates a method of implementation of a quantizer for channel information quantization in a wireless communication system according to an embodiment of the present disclosure.

FIG. 13 illustrates a method of implementation of a quantizer for channel information quantization in a wireless communication system according to an embodiment of the present disclosure.

Referring to FIG. 13, a method of implementing a trellis-coded quantizer using a 3/4 rate convolutional encoder is illustrated. Through this, 3/4 bits per channel trellis quantization may be outputted. In FIG. 13, the smaller the index the less significant the bit. For example, '$b_{in,1}$' is the least significant input bit and '$b_{in,3}$' is the most significant input bit.

Figure 14:
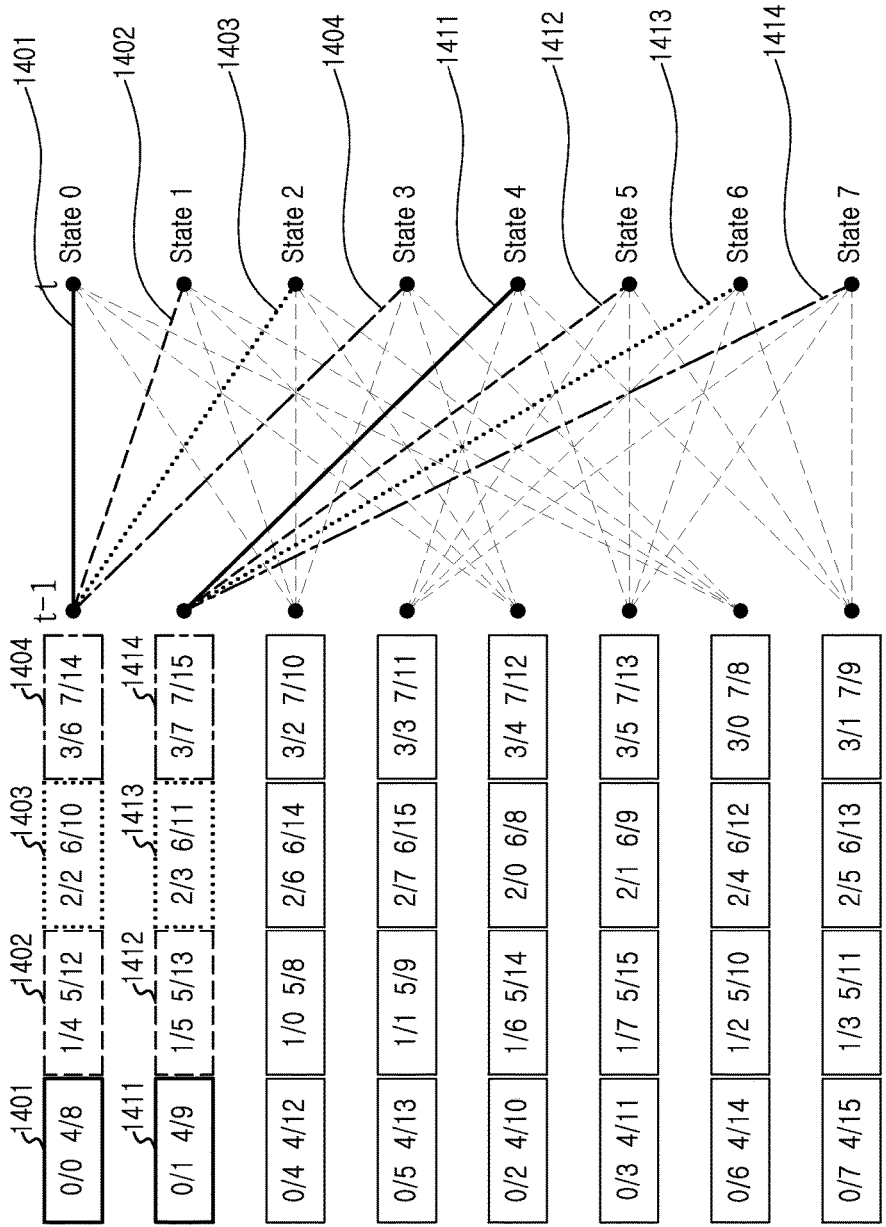
FIG. 14 illustrates a method of trellis for channel information quantization in a wireless communication system according to an embodiment of the present disclosure.

FIG. 14 illustrates a method of trellis for channel information quantization in a wireless communication system according to an embodiment of the present disclosure.

Referring to FIG. 14, an expression of a trellis structure corresponding to a 3/4 rate convolutional encoder illustrated in FIG. 13 is represented. Each state transition (1401, 1402, 1403, 1404, 1411, 1412, 1413, and 1414) in the right side of FIG. 14 consists of parallel transitions which are shown with input/output relations using decimal numbers in each box in the left side. For example, 1/4 and 5/12 (in decimal numbers) in the dotted transition 1402 from the state 0 to 1 corresponds to input=001/output=0100 (binary number) and input=101/output=1100 (binary number).

Table 2 below represents Table mapping 3GPP LTE 4Tx rank 1 codewords to the outputs of the trellis representation in FIG. 14.

TABLE 2

| $C_{even}$ | Trellis output index | 0 | 2 | 4 | 6 | 8 | 10 | 12 | 14 |
|---|---|---|---|---|---|---|---|---|---|
| | LTE codeword index | 0 | 4 | 2 | 6 | 1 | 5 | 3 | 7 |
| $C_{odd}$ | Trellis output index | 1 | 3 | 5 | 7 | 9 | 11 | 13 | 15 |
| | LTE codeword index | 8 | 12 | 10 | 14 | 9 | 13 | 11 | 15 |

Recall Equation 8 above that shows the duality of the beamforming VQ problem and the noncoherent sequence detection problem in AWGN channels. Moreover, noncoherent sequence detection problem in AWGN channels is also parallel to source coding problem as given in Equation 11 below.

$$c_{opt} = \underset{c \in C}{\operatorname{argmin}} \|h - e^{j\theta}c\|^2 \qquad \text{Equation 11}$$

In Equation 11 above, the '$c_{opt}$' denotes an optimal codeword, the 'C' denotes a codebook, the 'c' denotes a codeword within the codebook, and the 'h' denotes a channel vector.

Equation 11 above is a source coding problem that finds the optimal codeword '$c_{opt}$' which minimizes the mean squared error with 'h' for a given 'θ'. Therefore, an embodiment of the present disclosure relies on the concept of trellis-coded quantization (TCQ) [10], a source coding technique, to extend the LTE codebook for large-scale MIMO systems.

The TCQ exploits a trellis decoder and a convolutional encoder in channel coding as a source encoder and a source decoder in source coding, respectively.

According to an embodiment of the present disclosure, TEC including a 3/4 rate convolutional encoder illustrated in FIG. 13 and TEC having trellis representation illustrated in FIG. 14 corresponding to this may be used. However, convolutional encoders of various types and trellis representation thereof may be similarly used for TEC according to an embodiment of the present disclosure. For example, the 2/3 rate convolutional encoder illustrated in FIG. 15 and TEC having trellis representation illustrated in FIG. 16 corresponding to this may be used.

The object function in Equation 11 with a given 'θ' can be decomposed as in Equation 12 below.

$$\|h - e^{j\theta}c\|^2 = \sum_{t=1}^{M/L} \|h_{[L(t-1)+1:Lt]} - e^{j\theta}c_{[L(t-1)+1:Lt]}\|^2 \qquad \text{Equation 12}$$

In Equation 12 above, the 'h' denotes a channel vector, the 'c' denotes a codeword, the 'M' denotes the number of antennas, the 'L' is a design parameter and denotes a block size, the '$h_{[m:n]}$' denotes a truncated vector from an mth entry of a channel vector 'h' to an nth entry, and the '$c_{[m:n]}$' denotes a truncated vector from an mth entry of a codeword 'c' to an nth entry.

In Equation 12 above, the 11 is a design parameter, and the '$h_{[m:n]}$' and '$c_{[m:n]}$' are truncated vectors from an mth entry to an nth entry among a channel vector 'h' and a code vector 'c', respectively. For example, as illustrated in Equation 12, when the channel vector 'h' has a size of M (the number of transmission antennas of the transmitting node) (e.g., 16), the channel vector 'h' may be truncated into M/L (e.g., 16/4=4), and the truncated channel vectors 1401 to 1404 each may have four codewords.

At this time, when one of domains of the channel vector, i.e., a horizontal domain and a vertical domain is selectively used, two optimal codeword candidates may be calculated as in Equation 13 below.

$$c_{opt,1} = \underset{c \in C}{\operatorname{argmax}} \max_{\theta \in [0,2\pi)} |h - e^{j\theta}c|^2 \qquad \text{Equation 13}$$

$$c_{opt,2} = \underset{c \in C}{\operatorname{argmax}} \max_{\theta \in [0,2\pi)} |g - e^{j\theta}c|^2$$

In Equation 13 above, the 'C' denotes a codebook, the 'c' denotes a codeword within the codebook, the 'h' denotes a channel vector indexed with horizontal orientation priority, the 'g' denotes a channel vector indexed with vertical orientation priority, the '$c_{opt,1}$' denotes a first candidate of a codeword corresponding to the 'h', and the '$c_{opt,2}$' denotes a second candidate of the codeword corresponding to the 'g'. Here, $g=[h_{p,1}^T \ h_{p,2}^T \ \ldots \ h_{p,8}^T]^T$, and $h_{p,k}=[h_k, h_{8+k}, h_{16+k}, h_{24+k}]^T$.

These operations give the same codeword-to-antenna group mapping. The codeword candidates, i.e., the first candidate '$C_{opt,1}$' and the second candidate '$C_{opt,2}$' correspond to the cases when the vertical and horizontal domains are selected, respectively. The two optimization problems can be solved using the Viterbi algorithm. In addition, a final codeword may be fed back together with an indication representing the selected domain.

Equation 12 above or Equation 13 above may be effectively determined using the Viterbi algorithm. For example, in each state transition 't', one truncated channel vector $h_{[k(t-1)+1:Lt]}$ with size L×1 is quantized as $c_{[k(t-1)+1:Lt]}$. After M/L state transitions, the optimal codeword that minimizes Equation 12 because of the optimality of the Viterbi algorithm may be found. The path search with the Viterbi algorithm starts from the 'state 0' in the trellis. Otherwise, the receiving node needs to explicitly feed back information of the starting state of the optimal path, which increases the total feedback overhead.

Assume $c_{[L(t-1)+1:Lt]} \in C_{LTE,1}$ for t=1, ..., M/L. Here, the $C_{LTE,1}$ is the 3GPP LTE 4Tx rank one codebook defined in Table 1 above. Thus, L=4 in this case. However, arbitrary codebooks with different values of 'L', e.g., 3GPP LTE 2Tx rank one codebook may be also used. Moreover, for the spatial multiplexing with multiple receive antennas case, higher rank codebooks for $c_{[L(t-1)+1:Lt]}$ may be chosen as well with Frobenius norm operation.

Referring to FIG. 14, transitions from states 0, 2, 4, 6 (in decimal numbers) only have the outputs of even numbers 0, 2, 4, 6, 8, 10, 12, 14 (in decimal numbers) and transitions from states 1, 3, 5, 7 (in decimal numbers) only have the outputs of odd numbers 1, 3, 5, 7, 9, 11, 13, 15 (in decimal numbers). Thus, although 16 codewords may be exploited in total, the embodiment of the present disclosure only uses 3 bits to quantize L=4 entries of the channel vector 'h' in each state transition, and results in 3/4 bits per entry quantization.

Now, codewords $W_k^{\{1\}}$ (k=0, ..., 15 for k=0, ..., 15 of $C_{LTE,1}$ in Table 1 above are assigned to the outputs of the convolutional encoder in FIG. 13 or the trellis representation in FIG. 14. To minimize the quantization error, the minimum Euclidean distance is maximized between codewords that are assigned to each set of outputs of odd and even numbers in the trellis.

Assume that $C_{LTE,1}^{(1)}$ and $C_{LTE,1}^{(2)}$ denote all possible partitions of $C_{LTE,1}$ with the same cardinality as given in Equation 14 below.

$$C_{LTE,1}^{(1)} \cup C_{LTE,1}^{(2)} = C_{LTE,1}$$

$$C_{LTE,1}^{(1)} \cap C_{LTE,1}^{(2)} = \phi$$

$$\operatorname{card}(C_{LTE,1}^{(1)}) = \operatorname{card}(C_{LTE,1}^{(2)}) = 8 \qquad \text{Equation 14}$$

In Equation 14 above, the '$C_{LTE,1}$' denotes a codebook, the '$C_{LTE,1}^{(1)}$' and '$C_{LTE,1}^{(2)}$' represent partial sets of the '$C_{LTE,1}$', the 'card(•)' denotes the cardinality of an associated set, and 'φ' denotes an empty set. Assume $c_i^{(1)} \in C_{LTE,1}^{(1)}$ and $c_i^{(2)} \in C_{LTE,1}^{(2)}$. If '$C_{odd}$' and '$C_{even}$' are denoted as the set of codewords assigned to the outputs of odd numbers and even numbers, respectively, then '$C_{odd}$' and '$C_{even}$' can be given as in Equation 15 below.

$$C_{odd} = \underset{c_{LTE,1}^{(1)} \subset C_{LTE,1}}{\mathrm{argmax}} \ \underset{m \neq n}{\min} \|c_m^{(1)} - c_n^{(1)}\|^2 \qquad \text{Equation 15}$$

$$C_{even} = \underset{c_{LTE,1}^{(2)} \subset C_{LTE,1}}{\mathrm{argmax}} \ \underset{m \neq n}{\min} \|c_m^{(2)} - c_n^{(2)}\|^2$$

In Equation 15 above, the '$C_{odd}$' denotes a codeword assigned to the output of odd number, the '$C_{even}$' denotes a codeword assigned to the output of even number, the '$C_{LTE,1}$' denotes a codebook, the '$C_{LTE,1}^{(1)}$' and '$C_{LTE,1}^{(2)}$' represent partial sets of the '$C_{LTE,1}$' and the '$c_m^{(k)}$' denotes an mth codeword of '$C_{LTE,1}^{(k)}$'.

By exhaustive search, LTE codewords may be assigned to the trellis outputs of odd and even numbers as shown in Table 2 above. Trellis outputs 0, 2, 4, 6, 8, 10, 12, 14 of even number are assigned to indices 0, 4, 2, 6, 1, 5, 3, 7 of LTE codewords, respectively. Trellis outputs 1, 3, 5, 7, 9, 11, 13, 15 of odd number are assigned to indices 8, 12, 10, 14, 9, 13, 11, 15 of LTE codewords, respectively. Table 2 above is merely a method of mapping between LTE codeword and trellis output. Accordingly, other codeword-trellis output mappings are also possible.

Meantime, in the above description, it is assumed that θ is given a priori. However, θ is also the parameter that is optimized in Equation 12 above. Instead of searching over the whole space [0,2π), the θ may be parameterized as θ∈Θ={θ$_1$, . . . , θ$_K$} where $$\theta_k = \frac{2(k-1)\pi}{K},$$

and search over a designated range Θ may be expressed as in Expression 16 below.

$$\underset{c \in C}{\mathrm{argmin}} \ \underset{\theta \in \Theta}{\min} \|h - e^{j\theta}c\|^2 \qquad \text{Expression 16}$$

In Expression 16 above, the 'C' denotes a codebook, the 'c' denotes a codeword within the codebook, the 'Θ' denotes a path set, and the 'θ' denotes a path, and the 'h' denotes a channel vector.

Finally, the solution of Expression 16 above is given by performing the Viterbi algorithms 'K' times where each Viterbi algorithm is executed with a given θ. This parallel search only increases the complexity, not the feedback overhead because e is not needed in the channel reconfiguration process at the transmitter side.

Figure 15:
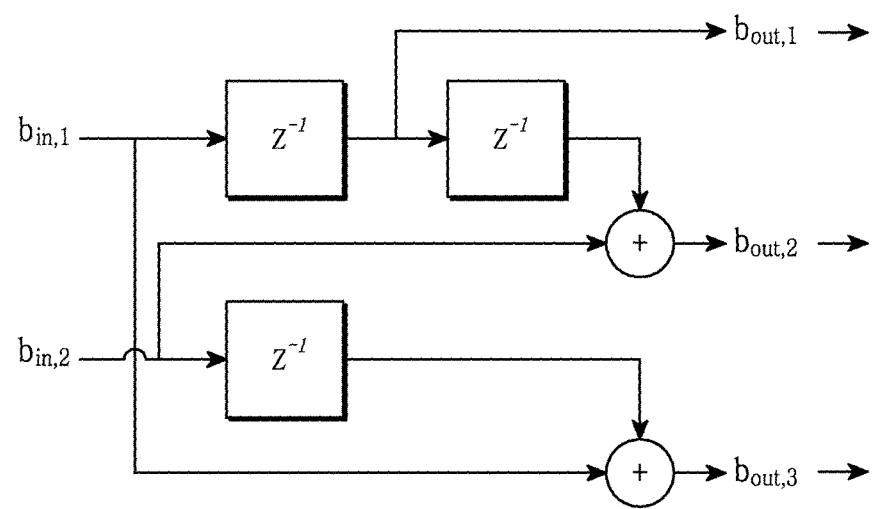
FIG. 15 illustrates a method of implementation of a quantizer for channel information quantization in a wireless communication system according to an embodiment of the present disclosure.

FIG. 15 illustrates a method of implementation of a quantizer for channel information quantization in a wireless communication system according to an embodiment of the present disclosure.

Referring to FIG. 15, a method of implementing a trellis-coded quantizer using a 2/3 rate convolutional encoder is illustrated. Through this, 1/2 bit may be outputted per channel entry quantization. In FIG. 15, the smaller the index the less significant the bit. For example, '$b_{in,1}$' is the least significant input bit and '$b_{in,2}$' is the most significant input bit.

Figure 16:
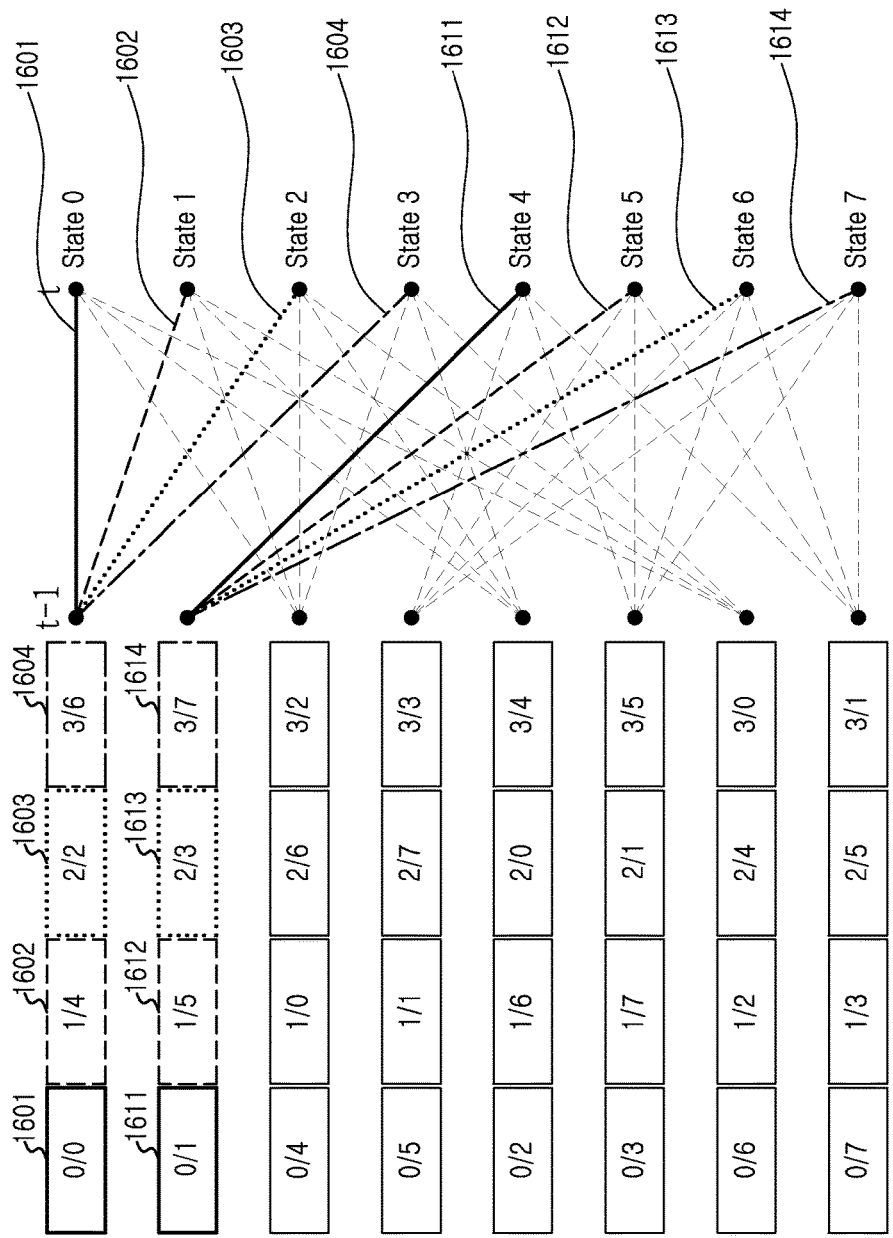
FIG. 16 illustrates a method of trellis for channel information quantization in a wireless communication system according to an embodiment of the present disclosure.

FIG. 16 illustrates a method of trellis for channel information quantization in a wireless communication system according to an embodiment of the present disclosure.

Referring to FIG. 16, an expression of a trellis structure corresponding to the 2/3 rate convolutional encoder illustrated in FIG. 15 is represented. Each state transition (1601, 1602, 1603, 1604, 1611, 1612, 1613, and 1614) in the right side of FIG. 16 consists of parallel transitions which are shown with input/output relations using decimal numbers in each box in the left. For example, 1/4 (in decimal numbers) in the dotted transition 1602 from the state 0 to 1 corresponds to input=01/output=100 (binary number).

Table 3 below represents Table mapping 3GPP LTE 4Tx rank 1 codewords to the outputs of the trellis representation in FIG. 16.

TABLE 3

| $C_{even}$ | Trellis output index | 0 | 2 | 4 | 6 |
|---|---|---|---|---|---|
|  | LTE codeword index | 0 | 1 | 2 | 3 |
| $C_{odd}$ | Trellis output index | 1 | 3 | 5 | 7 |
|  | LTE codeword index | 4 | 5 | 6 | 7 |

By changing the 3/4 rate convolutional encoder illustrated in FIG. 13 into the 2/3 convolutional encoder illustrated in FIG. 15, TEC having 1/2 bit per channel entry quantization may be easily implemented.

LTE codewords are assigned to the trellis outputs of odd and even numbers as shown in Table 3 for the 1/2 bits per channel entry quantization case. Trellis outputs 0, 2, 4, 6 of even number are assigned to indices 0, 1, 2, 3 of LTE codewords, respectively. Trellis outputs 1, 3, 5, 7 of odd number are assigned to indices 4, 5, 6, 7 of LTE codewords, respectively. Table 3 above is merely a method of mapping between LTE codeword and trellis output. Accordingly, other codeword-trellis output mappings are also possible.

The present disclosure describes a process of reconfiguring channel information with reference to FIG. 17 to FIG. 20 below. FIG. 17 to FIG. 20 below illustrate channel information reconfiguration corresponding to a quantization operation having a TEC using LTE 4TX codebook, and outputting a 1/2 bit per channel entry quantization.

FIG. 17 illustrates a method of channel information in a wireless communication system according to an embodiment of the present disclosure.

Referring to FIG. 17, assume the number (M) of transmit antennas is 16 and the channel vector 'h' is given as in presented in FIG. 17, and Θ={0,π}. Therefore, the Viterbi algorithm is executed two times to quantize the channel vector 'h'. The channel vector 'h' with a size of M=16 is truncated into M/L (=16/4=4) groups (or channel entries) 1701 to 1704. The channel vector of each group is trellis-coded quantized with truncated groups of corresponding code vectors among codebooks selected from the codebooks.

When quantizing the channel information using the existing LTE codebook as it is, the number of bits of feedback information is determined in proportion to the number of transmission antennas. For example, when the number of transmission antennas is 16, the feedback information is determined as 16 bits. However, according to an embodiment of the present disclosure, when a 2/3 rate convolutional encoder is used for a trellis-coded quantizer, a quantization result by group of each channel vector may be determined as two bits. In this case, because the channel information is truncated into four channel vectors, resultant feedback information is implementable with eight bits.

Figure 19:
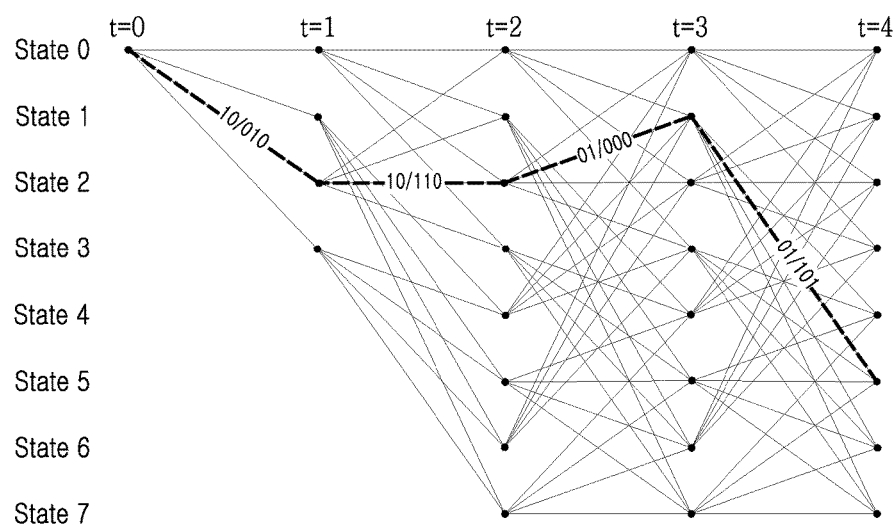
FIG. 19 illustrates a method of path search for reconfiguring channel information in a wireless communication system according to an embodiment of the present disclosure.
Figure 20:
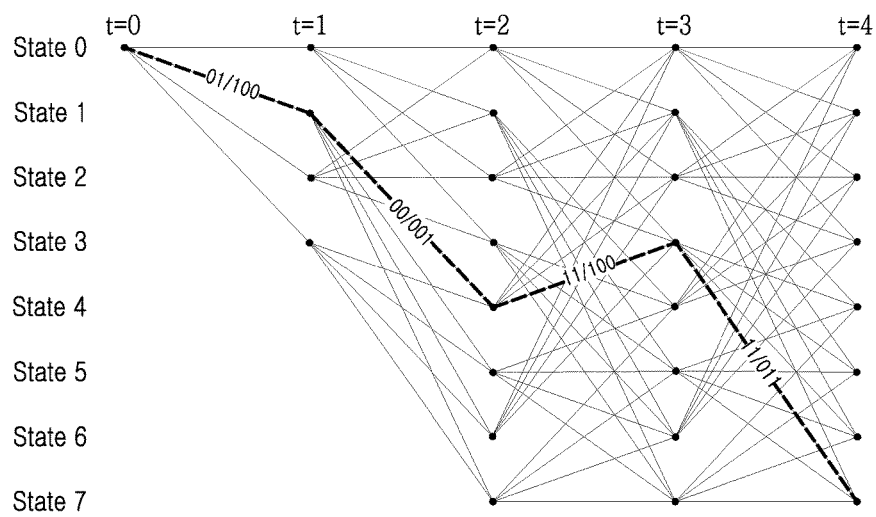
FIG. 20 illustrates a method of path search for reconfiguring channel information in a wireless communication system according to an embodiment of the present disclosure.

FIG. 19 illustrates a method of path search for reconfiguring channel information in a wireless communication system according to an embodiment of the present disclosure, and FIG. 20 illustrates a method of path search for reconfiguring channel information in a wireless communication system according to an embodiment of the present disclosure.

Referring to FIGS. 19 and 20, a path search by the Viterbi algorithm with $\theta=0$, $\theta=\pi$, respectively, is illustrated. In FIG. 19, the dotted path represents the optimal path having a minimal path metric m(0)=4.8357. An input sequence of the optimal path is binary number [10, 10, 01, 01]. In FIG. 20, the dotted path represents the optimal path having a minimal path metric. An input sequence of the optimal path is a binary number [01, 00, 11, 11]. Because m(0)<m($\pi$), $\theta_{opt}=0$ and the optimal path becomes the path illustrated in FIG. 19. Thus, the feedback sequence becomes $b_{opt}$=[10, 10, 01, 01].

At the transmitter side, the $b_{opt}$=[10, 10, 01, 01] becomes the input to the convolutional encoder illustrated in FIG. 11A, and the corresponding output sequence of the convolutional encoder is given as [010, 110, 000, 101] in binary numbers.

From the mapping Table illustrated in Table 3, the sequence of outputs corresponds to the LTE codewords $W_1^{\{1\}}$, $W_3^{\{1\}}$, $W_0^{\{1\}}$, and $W_6^{\{1\}}$, and the quantized channel vector $\hat{h}$ normalization is given as illustrated in FIG. 18.

FIG. 18 illustrates a method of quantized channel information in a wireless communication system according to a disclosure embodiment of the present disclosure.

Referring to FIG. 18, the optimal codeword is given as in Equation 17 below.

$$c_{opt} = \frac{\hat{h}}{\|\hat{h}\|} \quad \text{Equation 17}$$

In Equation 17 above, the '$c_{opt}$' denotes an optimal codeword, and the '$\hat{h}$' denotes a quantized channel vector.

The various embodiments of the present disclosure described above are described by way of example of a case of applying 3GPP LTE 4TX rank 1 codebook, but the various embodiments of the present disclosure may be identically applied to higher rank cases.

Trellis Extended Codebook (TEC) may be extended to higher rank cases by mapping higher rank codewords to the trellis outputs as in Table 2 or 3 above. TEC may preserve the orthogonal property of the codebook that is reused for TEC. The same mapping rule as in Table 2 or 3 above is used for higher rank cases to mimic the nested property of LTE codebook. This mapping rule is merely a method and other mapping rules are also possible.

Channel information quantization and reconfiguration according to a TE-SPA method may be carried out as follows. According to the TE-SPA method, the receiving node adjusts a phase for a trellis coded quantized result and feeds back. Further to the TEC method, the TE-SPA method may further improve performance by using trellis structures for successive phase adjustment for blocks of a quantized channel. The TE-SPA is similar to W=W1W2 structure of LTE-Advanced. The original TEC and TE-SPA can be considered as long-term/wideband CSI and short-term/subband CSI, respectively.

For the TE-SPA method, the receiving node may store the codebook as in Table 1 above. The receiving node trellis-coded quantizes the channel information using a codebook selected among a plurality of stored codebooks. In addition, the receiving node adjusts the quantization result as much as a predefined phase, and generates the phase-adjusted quantization result. The receiving node generates feedback information including the quantized channel information. In addition, the receiving node generates secondary feedback information including the quantized and phase-adjusted channel information. The receiving node transmits the generated feedback information and/or secondary feedback information to the transmitting node. The receiving node transmits the feedback information in a first period interval, and transmits the secondary feedback information in a second period interval. In an embodiment of the present disclosure, the second period interval is set to be shorter than the first period interval. According to an embodiment of the present disclosure, the feedback generating operation of the receiving node may be achieved in a manner illustrated in FIG. 21 below. For example, the feedback information including a quantized result is generated and transmitted at a first time point, and then the secondary feedback information including a phase adjustment result for a result quantized by a quantizer may be generated and transmitted at a second time point and a third time point.

For the TE-SPA method, the transmitting node receives the feedback information from the receiving node. The feedback information includes a trellis-coded quantized result. This feedback information is generated by trellis-coded quantizing channel information using a codebook selected among a plurality of codebooks by the receiving node. The trellis-coded quantization operation includes the operations of truncating the channel information and the codewords included in the selected codebook into blocks of a plurality of channel vectors and groups of a plurality of codewords, respectively, and quantizing the blocks of the respective channel vectors using the groups of the respective codewords. The transmitting node convolutional-codes the feedback information. For example, the convolution encoder may include one of a 3/4 rate convolution encoder, a 2/3 rate convolutional encoder, or a convolutional encoder having an arbitrary rate. In addition, the transmitting node maps the convolutional coding result, i.e., a trellis output to codewords according to a predefined mapping rule (e.g., Table 2 above and Table 3 above). In addition, the transmitting node maps the convolutional coding result, i.e., the trellis output to phases according to a predefined mapping rule (e.g., Table 4 below and Table 5 below). The transmitting node reconfigures a channel vector in accordance with the mapped codewords or phases.

Figure 21:
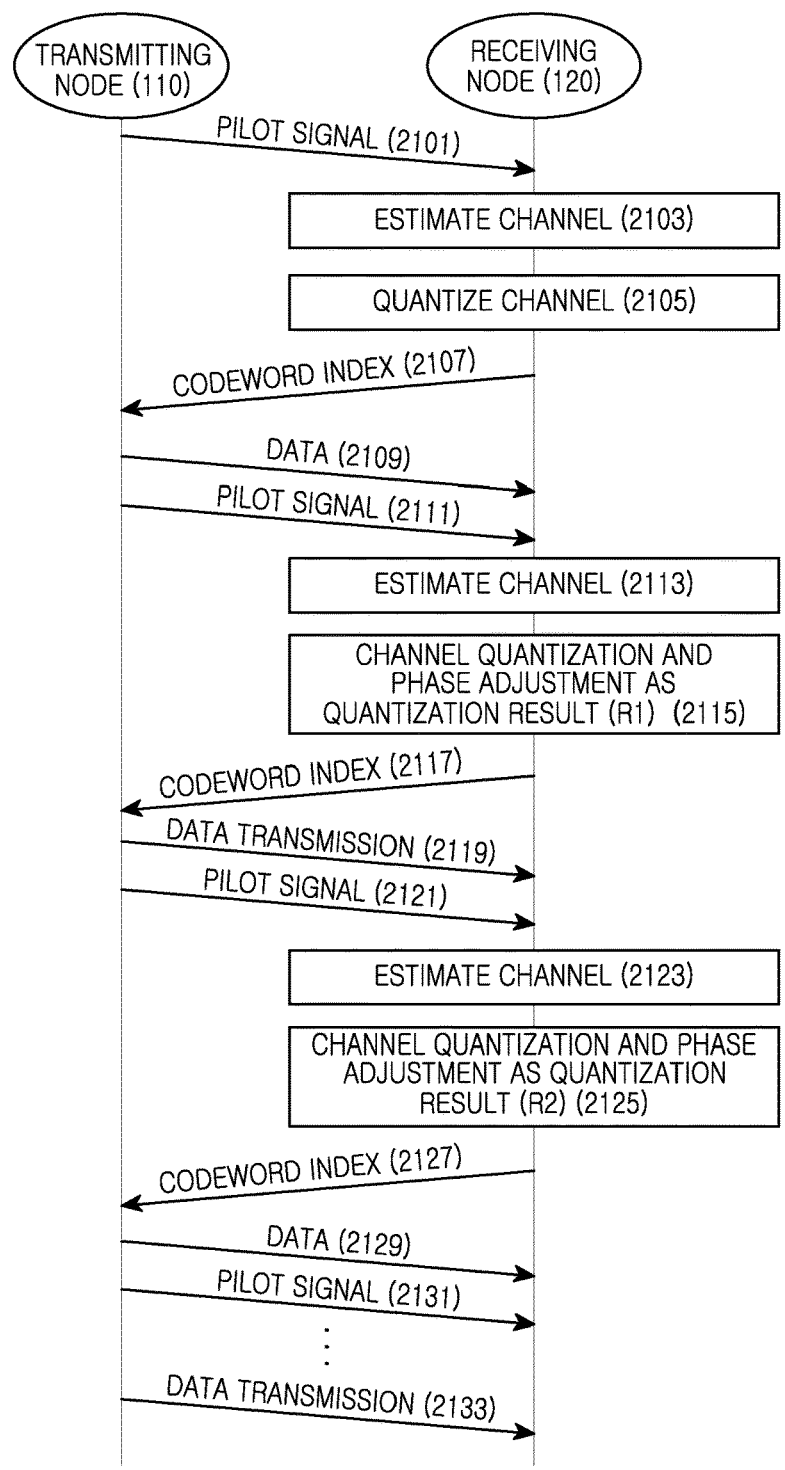
FIG. 21 illustrates a channel information feedback procedure in a wireless communication system according to an embodiment of the present disclosure.

FIG. 21 illustrates a channel information feedback procedure in a wireless communication system according to an embodiment of the present disclosure.

Referring to FIG. 21, in operation 2101, the transmitting node 110 transmits a pilot signal, and the receiving node 120 receives the pilot signal transmitted from the transmitting node 110. In operation 2103, the receiving node 120 estimates a channel using the received pilot signal. In operation 2105, the receiving node 120 quantizes the estimated channel using a trellis extended codebook. In operation 2107, the receiving node 120 feeds back an optimal codeword index $\hat{h}o$ selected as the quantization result, as feedback information, to the transmitting node 110. In operation 2109, the transmitting node 110 reconfigures a channel vector based on the information fed back from the receiving node 120, and transmits data to the receiving node 120 using the reconfigured channel vector.

Thereafter, in operation 2111, the transmitting node 110 transmits a pilot signal, and the receiving node 120 receives the pilot signal transmitted from the transmitting node 110. In operation 2113, the receiving node 120 estimates a channel using the received pilot signal. In operation 2115, the receiving node 120 outputs a channel quantization result by rotating (referring to the middle figure of FIG. 22 below) a previously transmitted optimal codeword index $\hat{h}_0$ with a phase adjustment matrix 'R1'. In operation 2117, the receiving node 120 feeds back a codeword index $\hat{h}_1 = R1\hat{h}_0$ according to the quantization result, as additional feedback information, to the transmitting node 110. In operation 2119, the transmitting node 110 reconfigures a channel vector based on the information fed back from the receiving node 120, and transmits data to the receiving node 120 using the reconfigured channel vector.

Thereafter, in operation 2121, the transmitting node 110 transmits a pilot signal, and the receiving node 120 receives the pilot signal transmitted from the transmitting node 110. In operation 2123, the receiving node 120 estimates a channel using the received pilot signal. In operation 2125, the receiving node 120 outputs a channel quantization result by rotating (referring to the right figure of FIG. 22 below) a previously transmitted optimal codeword index $\hat{h}_1$ with a phase adjustment matrix 'R2'. In operation 2127, the receiving node 120 feeds back a codeword index $\hat{h}_2 = R2\hat{h}_1$ according to the quantization result, as additional feedback information, to the transmitting node 110. In operation 2129, the transmitting node 110 reconfigures a channel vector based on the information fed back from the receiving node 120, and transmits data to the receiving node 120 using the reconfigured channel vector. In operation 2131, the transmitting node 110 transmits a pilot signal, and the receiving node 120 receives the pilot signal transmitted from the transmitting node 110. In operation 2133, the transmitting node 110 reconfigures a channel vector based on the information fed back from the receiving node 120, and transmits data to the receiving node 120 using the reconfigured channel vector.

Here, a description is made for an example in which, after feeding back feedback information (wideband/long-term feedback information) one time, the receiving node 120 feeds back additional feedback information (subband/short-term feedback information) two times. However, the transmission of the additional feedback information in the receiving node 120 may be achieved at appropriate times.

In the procedure illustrated in FIG. 21, the receiving node 120 generates the quantized channel information in operation 2105, operation 2115, and operation 2125. At this time, in accordance with an embodiment of the present disclosure, the receiving node may generate a plurality of candidates using channel vectors configured by different indexing rules, and quantize one of the candidates. Here, the channel vectors configured by the different indexing rules include a horizontal domain channel vector and a vertical domain channel vector.

According to an embodiment of the present disclosure, in a case of having channel information as illustrated in FIG. 17, that is, in a case where the number of transmit antennas of the transmitting node is M=16, if using the 2/3 rate convolutional encoder for trellis coded quantization, feedback information transmitted in long-term may be implemented as eight bits. In contrast, because the TE-SPA has to only provide only phase adjustment information compared to the TEC, transmission additional feedback information may be implemented with less bit count (e.g., four bits) in short-term.

Assume that the size of block for phase adjustment is the same as the VQ codebook used for the original TEC for simple explanation, but the size may be different also.

The previous quantized CSI $\hat{h}_{k-1}$ is rotated with block-wise phase adjustment matrix '$R_k$' which is given as in Equation 18 below.

$$R_k = \text{diag}([e^{j\varphi k,1}, \ldots, e^{j\varphi k, M/L}]^T \otimes 1_L)$$

Equation 18

In Equation 18 above, the '$R_k$' denotes a phase adjustment matrix, the 'M' denotes the number of antennas, the 'L' denotes a block size, the '$\otimes$' denotes the kronecker product, and the '$1_L$' is all 1 column vector with length 'L'.

Thereafter, the currently quantized channel information $\hat{h}_k$ is given as in Equation 19 below.

$$\hat{h}_k = R_k \hat{h}_{k-1}$$

Equation 19

In Equation 19 above, the '$\hat{h}_k$' denotes quantized channel information phase adjusted by the '$R_k$', and the '$R_k$' denotes a phase adjustment matrix.

The trellis structure is used to compute $\phi_k$ values in '$R_k$' by minimizing Equation 19 above with the Viterbi algorithm. This structure may be different from the trellis for the original TEC.

$$\underset{R_k}{\text{argmin}} \underset{\theta \in \Theta}{\min} \| h_k - e^{j\theta} R_k \hat{h}_{k-1} \|^2$$

Expression 20

In Expression 20 above, the '$R_k$' denotes a phase adjustment matrix, the '$\Theta$' denotes a path set, the '$\theta$' denotes a path, the '$h_k$' denotes a channel vector, and the '$\hat{h}_k$' denotes quantized channel information phased-adjusted by the '$R_k$'.

The first state transition suffers from the restricted number of branches as shown in FIGS. 19 and 20. To mitigate this loss and further reduce quantization error in time, 'block shifting' is applied before trellis optimization. Assume a (i→i+k) and A (i→i+k) as the circularly shifting of a vector 'a' and diagonal entries of a matrix 'A' with 'k' elements, respectively. For example, if a=[1,2,3,4,5,6], then a(i→i+2)=[3,4,5,6,1,2].

Thereafter, the optimization problem in Expression 20 above can be rewritten as in Expression 21 below, and the quantized channel vector is given as in Equation 22 below.

$$\underset{R_k}{\text{argmin}}$$

Expression 21

$$\underset{\theta \in \Theta}{\min} \left\| hk\left(i \to i + \frac{L}{2}(t-1)\right) - e^{j\theta} R_k \hat{h}_{k-1}\left(i \to i + \frac{L}{2}(t-1)\right) \right\|^2$$

$$\hat{h}_k = R_k\left(i \to i - \frac{L}{2}(t-1)\right)\hat{h}_{k-1}$$

Equation 22

In Expression 21 and Equation 22 above, the '$R_k$' denotes a phase adjustment matrix, the '$\Theta$' denotes a path set, the '$\theta$' denotes a path, the '$h_k$' denotes a channel vector, the 'L' denotes a block size, and the '$\hat{h}_k$' denotes quantized channel information phased-adjusted by the '$R_k$'. The conceptual explanation of TE-SPA with shifting is shown in FIG. 22.

Figure 22:
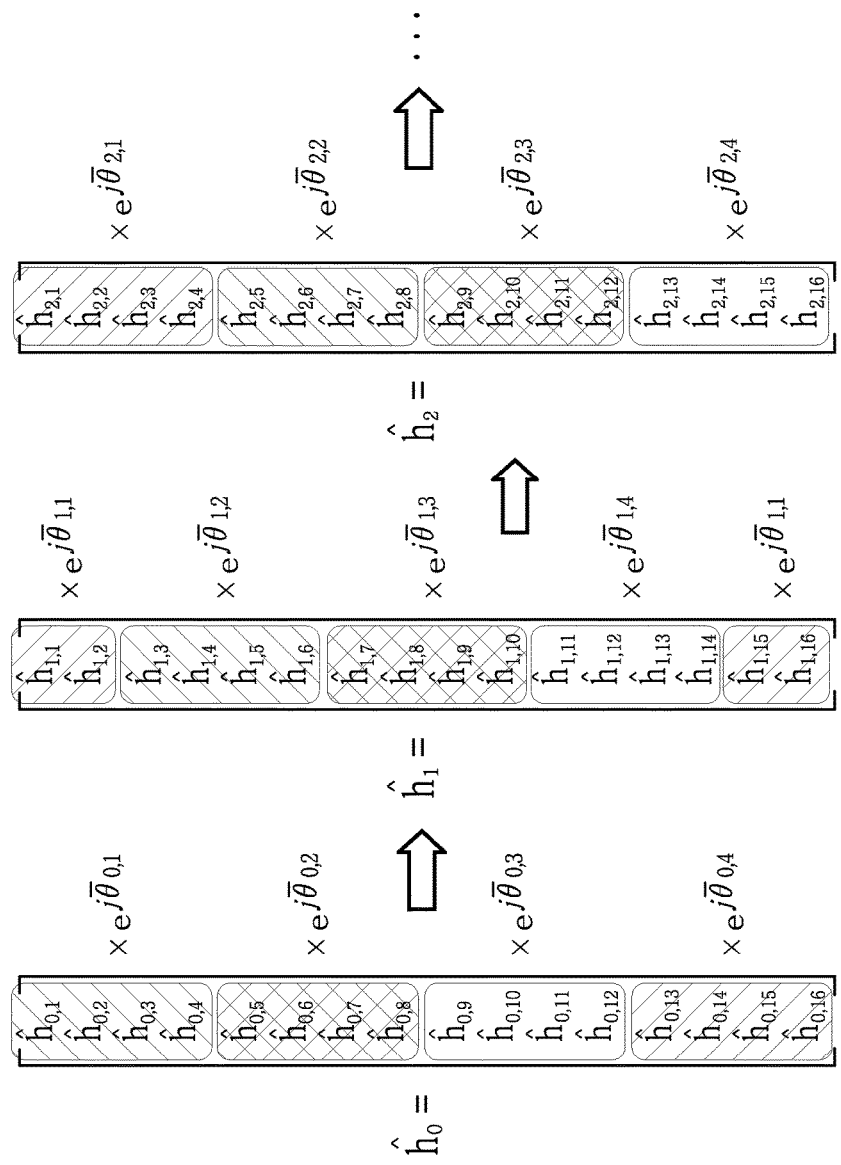
FIG. 22 illustrates phase adjustment for a channel quantization result in a wireless communication system according to an embodiment of the present disclosure.

FIG. 22 illustrates phase adjustment for a channel quantization result in a wireless communication system according to an embodiment of the present disclosure.

Referring to FIG. 22, a phase adjustment $e^{j\Theta_{K,1}}$ from the first state transition at time 'k' is multiplied by different blocks in accordance with 'k'. For example, the phase adjustment $e^{j\Theta_{0,k}}$ at time k=0 is multiplied by a block of four codewords of a channel vector, and the phase adjustment $e^{j\Theta_{1,k}}$ at time k=1 is multiplied by a block of five codewords of the channel vector, and the phase adjustment $e^{j\Theta_{2,k}}$ at time k=2 is multiplied by a block of four codewords of the channel vector.

In accordance with an embodiment of the present disclosure, because two domains for the channel vector are considered, the aforementioned process is performed even for $\hat{g}_{t-1} = [\hat{h}_{p,1}{}^T \hat{h}_{p,2}{}^T \ldots h_{p,1}{}^T]^T$ being a perturbed version of the $h_{t-1}$. Here, $\hat{h}_{p,k} = [\hat{h}_k, \hat{h}_{8+k}, \hat{h}_{16+k}, \hat{h}_{24+k}]^T$. In accordance with this, as in FIGS. 23A and 23B below, phase adjustment may be applied to differently blocked antennas in accordance with two domains.

FIGS. 23A and 23B illustrates phases applied to an antenna group in a wireless communication system according to an embodiment of the present disclosure.

Referring to FIG. 23A, a case of being blocked with a horizontal domain is illustrated.

Referring to FIG. 23B, a case of being blocked with a vertical domain is illustrated. The common phase is applied to one antenna group. When the vertical domain is selected as the preferred domain, the receiving node may adjust the relation of phases of antenna groups vertically as in FIG. 5A. Similarly, when the horizontal domain is selected as the preferred domain, the receiving node may adjust the relation of phases of antenna groups horizontally as in FIG. 5B.

For each domain, channel information quantization may be carried out as follows. For TE-SPA according to an embodiment of the present disclosure, two different trellis structures of a case where a channel entry quantization result is 1/2 bit and is 1/4 bit may be applied. For the TE-SAP, if the channel entry quantization result is 1/2 bit, a corresponding relation between trellis output and phase may be defined as in Table 4 below.

TABLE 4

| $C_{even}$ | Trellis output index | 0 | 2 | 4 | 6 |
|---|---|---|---|---|---|
| | Phase for φ | 0 | 2/8π | 4/8π | 6/8π |
| $C_{odd}$ | Trellis output index | 1 | 3 | 5 | 7 |
| | Phase for φ | 1/8π | 3/8π | 5/8π | 7/8π |

The convolutional encoder corresponding to phase values illustrated in Table 4 above is a 2/3 rate convolutional encoder as illustrated in FIG. 13, and a trellis structure corresponding to this is given as in FIG. 14.

In a case of 1/2 bit per channel entry quantization, as illustrated in Table 5 above, phases may be assigned to trellis outputs of odd number and even number. The trellis outputs 0, 2, 4, 6 of even number are assigned to phase indices 0, 2/8 π, 4/8 π, 6/8π, respectively. The trellis outputs 1, 3, 5, 7 of odd number are assigned to phase indices 1/8 π, 3/8 π, 5/8π, 7/8π, respectively. Table 4 above is merely a method of mapping between phases and trellis output. Accordingly, other phase-trellis output mappings are also possible.

Figure 24:
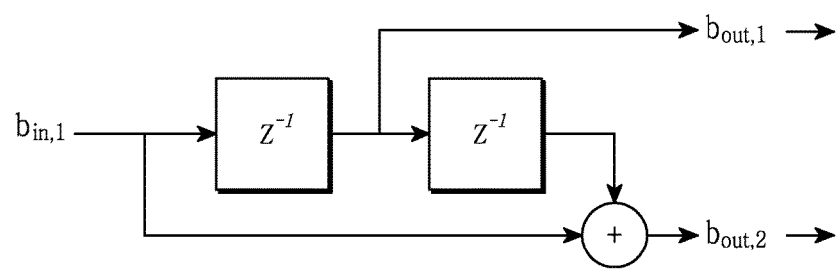
FIG. 24 illustrates an implementation of a phase adjustment unit in a wireless communication system according to an embodiment of the present disclosure.
Figure 25:
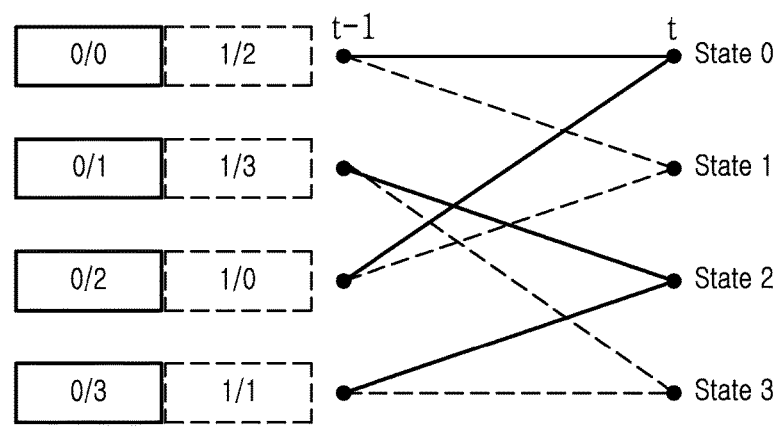
FIG. 25 illustrates a method of trellis for phase adjustment in a wireless communication system according to an embodiment of the present disclosure.

FIG. 24 illustrates a method of implementation of a quantizer for channel information quantization in a wireless communication system according to an embodiment of the present disclosure. FIG. 25 illustrates a method of trellis for channel information quantization in a wireless communication system according to an embodiment of the present disclosure.

Referring to FIGS. 24 and 25, a case where a channel entry quantization result is 1/4 bit for the TE-SPA is represented. FIG. 24 illustrates the 1/2 rate convolutional encoder, and the trellis structure corresponding to the quantizer illustrated in FIG. 24 is given as in FIG. 25 above.

In a case of 142 bits per channel entry quantization, a corresponding relation between trellis outputs and phases may be defined as in Table 5 below.

TABLE 5

| $C_{even}$ | Trellis output index | 0 | 2 |
|---|---|---|---|
| | Phase for φ | 0 | 2/4π |
| $C_{odd}$ | Trellis output index | 1 | 3 |
| | Phase for φ | 1/4π | 3/4π |

As in Table 5 above, phases may be assigned to trellis outputs of odd number and even number. The trellis outputs 0, 2 of even number are assigned to phase indices 0, 2/4 π, respectively. The trellis outputs 1, 3 of odd number are assigned to phase indices 1/4 π, 3/4 π, respectively. Table 5 above is merely a method of mapping between phases and trellis output. Accordingly, other phase-trellis output mappings are also possible.

The simulation experiment result for evaluating the performance of a wireless communication system according to an embodiment of the present disclosure is given as follows. In the simulation experiment, the number (M) of antennas of the transmitting node is set as '32', and the number of antennas of the receiving node is set as '1'. The channel is defined to have a characteristic of Equation 23 below.

$$h[n] = \eta h[n-1] + \sqrt{1-\eta^2} R^{1/2} w[n] \qquad \text{Equation 23}$$

In Equation 23 above, the 'h[n]' is the M×1 channel vector at time 'n', the 'η' is the temporal correlation coefficient, the 'R=E[h[n]$^H$h[n]]' is the spatial correlation matrix, and the 'w[n]~CN(0, I)'' is the innovation process at time 'n'. The 'R' follows the model in the [5] and η=0.9881. The beamforming gain may be defined as a performance metric, such as Expression 24 below.

$$E[h[n]^H c_{opt}[n]] \qquad \text{Expression 24}$$

In Expression 24 above, the 'h[n]' denotes the M×1 channel vector at time 'n', and the '$c_{opt}$' denotes an optimal codeword at time 'n'. The simulation experiment carried out on the premise of the aforementioned conditions is given as in FIGS. 26A and 26B below.

Figure 26A:
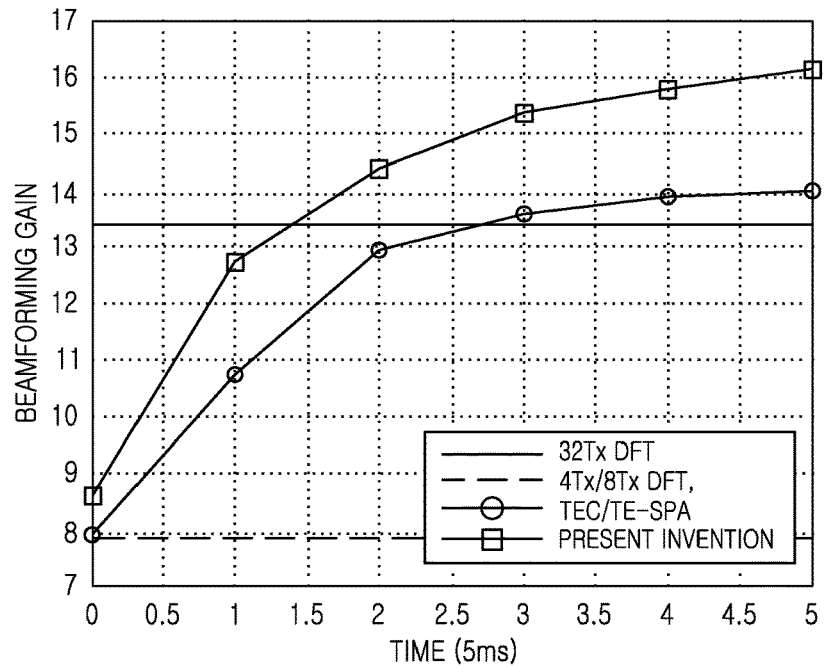
FIGS. 26A and 26B illustrate a simulation experiment result of a wireless communication system according to an embodiment of the present disclosure.
Figure 26B:
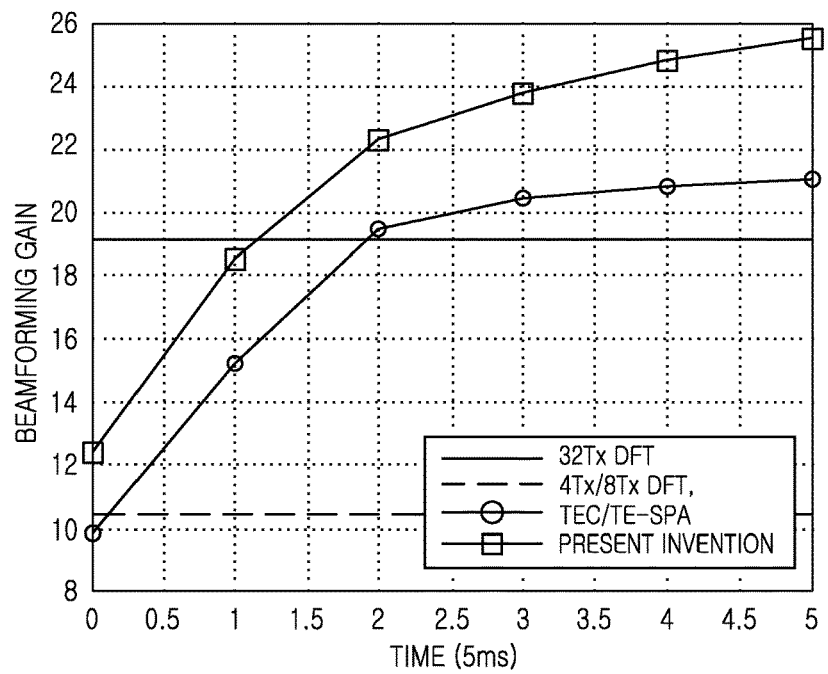

FIGS. 26A and 26B illustrate a simulation experiment result of a wireless communication system according to an embodiment of the present disclosure.

Referring to FIGS. 26A and 26B, four different schemes are compared and illustrated. The four schemes are a scheme using a 32Tx DFT codebook, a scheme of Kronecker product-based approach using 4Tx/8Tx DFT codebooks, a TEC/TE-SPA scheme, and a scheme according to the present disclosure.

The scheme using the 32Tx DFT codebook and the TEC/TE-SPA scheme have the feedback overhead of '$B_{tot}$=16', i.e., 16 bits. In contrast, the scheme of Kronecker product-based approach using the 4Tx/8Tx DFT codebooks and the scheme according to the present disclosure have the feedback overhead of '$B_{tot}$=17', i.e., 17 bits. The 17 bits may be divided into two as 7 and 10 bits for 4Tx and 8Tx DFT codebooks, respectively. In a case of the scheme of the present disclosure, an indication may indicate the preferred domain between horizontal and vertical domains as an additional feedback.

In FIGS. 26A and 26B, four schemes with different standard deviations of horizontal and vertical angular perturbations are compared. The scheme of the present disclosure outperforms the Kronecker product-based approach with the same feedback overhead. In addition, the scheme of the present disclosure is also comparable with 32Tx DFT codebook consisting of 65536 vector-quantized codewords. The complexity of the scheme using the 32Tx DFT codebook would not be feasible in practice.

In feeding back channel information quantized in block-wise manner in the wireless communication system, a domain for blocking a channel vector is adaptively changed, thereby being capable of improving a beamforming gain.

Embodiments of the present disclosure according to the claims and description in the specification can be realized in the form of hardware, software or a combination of hardware and software.

Such software may be stored in a non-transitory computer readable storage medium. The non-transitory computer readable storage medium stores one or more programs (software modules), the one or more programs comprising instructions, which when executed by one or more processors in an electronic device, cause the electronic device to perform methods of the present disclosure.

Such software may be stored in the form of a volatile or non-volatile storage, such as, for example, a storage device, such as an erasable or rewritable Read Only Memory (ROM), or in the form of a memory such as, for example, a Random Access Memory (RAM), memory chips, device or integrated circuits or on an optically or magnetically readable medium, such as, for example, a Compact Disc (CD), a Digital Video Disc (DVD), a magnetic disk or a magnetic tape, or the like. It will be appreciated that the storage devices and storage media are embodiments of machine-readable storage that are suitable for storing a program or programs comprising instructions that, when executed, implement embodiments of the present disclosure. Embodiments provide a program comprising code for implementing an apparatus or a method as claimed in any one of the claims of this specification and a machine-readable storage storing such a program. Still further, such programs may be conveyed electronically via any medium, such as a communication signal carried over a wired or wireless connection and embodiments suitably encompass the same.

In the aforementioned concrete various embodiments of the present disclosure, elements of the disclosure have been expressed in the singular number or the plural number in accordance with the proposed concrete various embodiments. However, for description convenience, the expression of the singular number or plural number is merely selected suitable to a proposed situation, and the present disclosure is not limited to singular or plural elements. Even the element expressed in the plural number may be implemented in the singular number, or even the element expressed in the singular number may be implemented in the plural number.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a receiving node in a wireless communication system, the method comprising:
   receiving a signal for estimating a channel;
   truncating estimated channel information and codewords in a codebook into groups of a plurality of channel vectors and groups of a plurality of codewords, respectively;
   trellis-code-quantizing the groups of the respective channel vectors based on the groups of the respective codewords;
   select channel information whose beamforming gain is larger among the trellis-code-quantized channel information;
   determining a domain corresponding to the selected channel information between a horizontal domain or a vertical domain for antenna elements;
   transmitting an indication representing the determined domain and the selected channel information; and
   receiving signals, wherein the signals are beamformed based on the indication and the selected channel information.

2. The method of claim 1,
   wherein the indication is usable for representing an indexing rule for the antenna elements according to the horizontal domain or the vertical domain, and
   wherein the channel information is usable for indicating at least one codeword corresponding to each group of the antenna elements.

3. The method of claim 1, wherein the codebook is selected among a plurality of codebooks.

4. The method of claim 1, further comprising:
   transmitting phase-adjusted channel information generated by adjusting the group-wise quantized channel information, to a transmitting node.

5. A method for operating a transmitting node in a wireless communication system, the method comprising:
   transmitting a signal for estimating a channel;
   receiving selected channel information whose beamforming gain is larger among trellis-code-quantized channel information and an indication representing a domain corresponding to the selected channel information between a horizontal domain or a vertical domain for antenna elements; and
   transmitting signals, wherein the signals are beamformed based on the indication and the channel information,
   wherein the trellis-code-quantized channel information is from groups of respective channel vectors based on groups of respective codewords, and
   wherein the groups of respective channel vectors and the groups of respective codewords are truncated from estimated channel information and codewords in a codebook, respectively.

6. The method of claim 5,
   wherein the indication is usable for representing an indexing rule for the antenna elements according to the horizontal domain or the vertical domain, and
   wherein the channel information is usable for indicating at least one codeword corresponding to each group of the antenna elements.

7. The method of claim 5, wherein the codebook is selected among a plurality of codebooks.

8. The method of claim 5, further comprising receiving phase-adjusted channel information generated by adjusting the group-wise quantized channel information.

9. An apparatus for a receiving node in a wireless communication system, the apparatus comprising:
   a transceiver;
   at least one processor coupled to the transceiver, and configured to:
   receive a signal for estimating a channel,
   truncate estimated channel information and codewords in a codebook into groups of a plurality of channel vectors and groups of a plurality of codewords, respectively, trellis-code-quantize the groups of the respective channel vectors based on the groups of the respective codewords,
select channel information whose beamforming gain is larger among the trellis-code-quantized channel information,
determine a domain corresponding to the selected channel information between a horizontal domain or a vertical domain for antenna elements, and
transmit an indication representing the determined domain and the selected channel information, and
receive signals,
wherein the received signals are beamformed based on the indication and the selected channel information.

10. The apparatus of claim 9,
wherein the indication is usable for representing an indexing rule for the antenna elements according to the horizontal domain or the vertical domain, and
wherein the channel information is usable for indicating at least one codeword corresponding to each group of the antenna elements.

11. The apparatus of claim 9, wherein the codebook is selected among a plurality of codebooks.

12. The apparatus of claim 9, wherein the at least one processor is further configured to transmit to a transmitting node phase-adjusted channel information generated by adjusting the group-wise quantized channel information.

13. An apparatus for a transmitting node in a wireless communication system, the apparatus comprising:
a transceiver; and
at least one processor coupled to the transceiver, and configured to:
transmit a signal for estimating a channel,
receive selected channel information whose beamforming gain is larger among trellis-code-quantized channel information and an indication representing a domain corresponding to the selected channel information between a horizontal domain or a vertical domain for antenna elements, and
transmit signals, wherein the signals are beamformed based on the indication and the channel information,
wherein the trellis-code-quantized channel information is from groups of respective channel vectors based on groups of respective codewords, and
wherein the groups of respective channel vectors and the groups of respective codewords are truncated from estimated channel information and codewords in a codebook, respectively.

14. The apparatus of claim 13,
wherein the indication is usable for representing an indexing rule for the antenna elements according to the horizontal domain or the vertical domain, and
wherein the channel information is usable for indicating at least one codeword corresponding to each group of the antenna elements.

15. The apparatus of claim 13, wherein the codebook is selected among a plurality of codebooks.

16. The apparatus of claim 13, wherein the at least one processor is further configured to receive phase-adjusted channel information generated by adjusting the group-wise quantized channel information.

* * * * *